United States Patent [19]
Homan

[11] Patent Number: 5,900,137
[45] Date of Patent: May 4, 1999

[54] APPARATUS AND METHOD FOR SEPARATING COMPONENTS IN WELL FLUIDS

[76] Inventor: Edwin Daryl Homan, 981 East Chestermere Drive, Chestermere, Alberta, Canada, T1X 1A8

[21] Appl. No.: 08/671,422

[22] Filed: Jun. 27, 1996

[51] Int. Cl.⁶ .......................... B01D 17/025; B01D 19/00
[52] U.S. Cl. ............................ 210/85; 210/104; 210/123; 210/124; 210/137; 210/170; 210/187; 210/188; 210/262; 210/512.1; 210/532.1; 210/540; 210/241; 95/19; 95/22; 95/253; 96/156; 96/184; 96/185; 96/187; 175/48; 175/62; 175/206
[58] Field of Search .............................. 96/182, 183, 184, 96/204, 206, 208, 209, 157, 158, 165, 156, 185, 187; 175/17, 24, 25, 28, 40, 48, 206, 207, 62, 212; 95/253, 1, 19, 22, 24, 241; 210/85, 92, 104, 103, 123, 127, 137, 170, 187, 188, 252, 259, 262, 512.1, 532.1, 538, 539, 540, 241

[56] References Cited

U.S. PATENT DOCUMENTS

| | | |
|---|---|---|
| 3,159,473 | 12/1964 | Meyers et al. . |
| 3,704,567 | 12/1972 | Engel . |
| 4,010,012 | 3/1977 | Griffin et al. ............................ 55/169 |
| 4,247,312 | 1/1981 | Thakur et al. ........................... 55/166 |
| 4,515,607 | 5/1985 | Wolde-Michael ....................... 55/166 |
| 4,673,500 | 6/1987 | Hoofnagle et al. .................... 210/307 |
| 4,683,963 | 8/1987 | Skinner .................................. 175/66 |
| 4,737,168 | 4/1988 | Heath ...................................... 55/45 |
| 5,010,966 | 4/1991 | Stokley ................................... 175/66 |
| 5,149,344 | 9/1992 | Macy ..................................... 55/167 |
| 5,256,171 | 10/1993 | Payne . |
| 5,415,776 | 5/1995 | Homan .................................. 210/519 |
| 5,498,270 | 3/1996 | Smith ...................................... 96/155 |

FOREIGN PATENT DOCUMENTS

| | | | |
|---|---|---|---|
| 1188631 | 6/1985 | Canada .......................... B01D 19/00 |
| 2041479 | 10/1992 | Canada .......................... B01D 21/02 |
| 2121831 | 10/1995 | Canada .......................... B01D 21/02 |

*Primary Examiner*—Robert J. Popovics
*Attorney, Agent, or Firm*—Kerkam, Stowell, Kondracki & Clarke, P.C.; John C. Kerins

[57] ABSTRACT

A system for separation of fluids and drill cuttings received from a borehole during an under-balanced drilling procedure. The system is designed to cope with significantly varied pressures and flow rates, particularly in relation to gas content of drill fluids returned to the surface during the drilling process in a production zones and to provide effective separation and to reduce the detrimental effect due to the presence of the drill cuttings in the returned drill fluids. In the present invention there is utilized a first stage, high pressure vessel in which a major portion of the gases ad drill cuttings are separated, and a second stages horizontal low pressure vessel, preferably of greater volume than the high pressure vessel, in which further separating is achieved, including the separate removal of the drilling liquid to be returned to the drill tube. Because in under-balance drilling, the most serious variation in the pressure of the returning fluid is due to rapid increases in the proportion of gases in the drill fluid, the system of the present invention includes features allowing the control of the operating pressure in the high pressure vessel by way of the flow control of the gases exiting the high pressure vessel while the remaining separating procedure continues to provide effective results.

18 Claims, 12 Drawing Sheets

APPARATUS AND METHOD FOR SEPARATING COMPONENTS IN WELL FLUIDS

FIELD OF THE INVENTION

This invention relates to an apparatus and method for separating components of well effluent, and more particularly, to a system for use in processing drilling fluids utilized in the under-balanced drilling technique of production zones.

DESCRIPTION OF THE PRIOR ART

The use of under-balanced drilling, while presently a more expensive operation to perform than conventional methods, is gaining acceptance in view of enhanced rate of recovery and total well production which is achieved by this method. The better production characteristics obtained result from the lack of damage caused to the surrounding formation of the borehole experienced in known methods utilizing drilling mud which presents a borehole pressure greater than that present in the formation.

In the closed separating systems developed for under-balanced systems to date, a number of the operating characteristics have presented major problems, including those relating to safety, erosion of parts of the system, incomplete separation and potential disruptions or failures due to the presence of hydrates. The principle of under-balanced drilling involves pumping fluids into the drilling area of the borehole at a pressure which is below the pressures in the formation surrounding the borehole, as opposed to that of providing a higher drilling fluid pressure by the use of drilling mud. When areas of high pressures are encountered in the formation, during under-balanced drilling the sudden expulsion of higher pressure fluids into the closed system may cause serious problems. This condition presents problems in the quality of separation and with regard to safety. In addition to not having facilities to deal with such abnormal conditions which develope, known facilities of the type, which include separating chambers in a single stage horizontal or vertical vessel, do not accomplish sufficiently complete separation, particularly of the gas from the liquid under the varying conditions experienced.

A common practice in known systems is to provide a main choke valve in the pipe returning the fluids from the well head to the closed separator vessel so as to effectively determine the amount of fluid reaching the vessel. These fluids contain, of courses the drill cuttings, and theses together with a significant amount of pressure drop across the choke valve, result in serious erosion problems. The continued damage to the valve is a safety concern and significantly adds to the expense of operating the system, not only due to the high cost of such valves, but because of downtime and maintenance costs, Also, the expansion of the fluids caused by the choking action of the valve in the control of the amount of fluids entering the system may also cause the formation of hydrates in the fluid to the extent there is a loss of control of the flow of the drilling fluids into the system or even a complete blockage of the inlet. Moreover serious damage can be caused within the system if parts of the frozen material break away and are forced rapidly downstream by the back-up of pressure behind the blockage. The presence of hydrates are also known to cause problems in other parts of the system such as a freeze up in the gas line running from the separator vessel to the flare stack.

In order to deal with such problems caused by the hydrates and also to achieve better separation characteristics in known systems, heating units are used. For example, heating devices have been adopted to apply heat to the incoming fluid in the line both before and after the choke valve which precedes the inlet to the separator vessel. This is done by passing the incoming fluid through coils which are externally exposed to heat such as a heated medium in a chamber. The well fluid being carried in the coils contains the drill cuttings, and therefore, the heating unit is also exposed internally to a higher rate of erosion due to the abrasive effect of the drill cuttings.

SUMMARY OF THE INVENTION

It is an object of the present invention to provide a separating system, which when used in association with an under-balanced drilling procedure, will cope with significant varying fluid pressures of the drill fluid received from the borehole without necessitating an interruption of the drilling procedure.

It is also an object of the present invention to accomplish satisfactory separation of the gases and liquids in the drilling fluid in spite of fluctuations in the incoming drill fluids, and to achieve effective separation of the drill cuttings in a manner to reduce erosion due to the presence of the drill cuttings.

Yet a further object of the present invention is to be able to determine characteristics necessary for efficient operation of the drilling procedure easily and without disturbing the drilling procedure.

According to one aspect of the present invention there is provided a process for separating drilling fluids received at significantly varied pressures from a borehole during a downhole drilling operation utilizing an under-balance drilling system The process involves transferring the drilling fluids from the borehole to a first stages high pressure vessels and passing the drilling fluids through a separator means in the high pressure vessel to separate a major portion of gases from liquids in the drilling fluids. The liquids and residual gases therein are then transferred from the high pressure vessel to a second stage, horizontal low pressure vessel of greater volume than the high pressure vessel, and the transferred liquids and residual gases are passed through a separating means in the low pressure vessel for separating at least some of the residual gases from the liquids. The liquids are then flowed through separating chambers in the low pressure vessel while maintaining the liquids at a liquid level with a predetermined range so that liquids of different densities separate into different layers and further residual gases escape to a gas collection zone above the liquid level. The liquid from at least one of the layers of liquids is collected for return to the borehole. The outflow volume of gases from the high pressure vessel are varied to establish an operating pressure in the high pressure vessel within a predetermined range to thereby compensate for the varying pressures of the drill fluids received from the borehole.

In an embodiment of the above process, a significant portion of the drill cuttings carried in said drill fluids are separated from said liquids by way of the separator means in the high pressure vessel.

Another aspect of the present invention resides in a separation system for processing drilling fluids received from a borehole through a delivery pipe, the system having a first stage and a second stage, wherein the first stage is a high pressure vessel having a fluid inlet for receiving fluid from the delivery pipe and the second stage is a horizontal, low pressure vessel which has a liquid inlet means and a liquid outlet means. A separator means is provided in the high pressure vessel for initial separation of gases and solid drill cuttings from the fluid received by the fluid inlet of the high pressure vessel, and the high pressure vessel has a liquid outlet means spaced from the separator means therein. A first level control means is provided in the high pressure vessel for maintaining a level of liquid in the high pressure vessel so as to provide thereabove a space for containing a volume of gas separated from the drilling fluids, and means is provided for conducting liquid from the liquid outlet means of the high pressure vessel to the liquid inlet means of the low pressure vessel. A settling area is defined in the low pressure vessel between the liquid inlet means and the liquid outlet means thereof, and there is provided a second liquid control means in the low pressure vessel for maintaining a level of liquid in the low pressure vessel so as to provide thereabove a space for containing a volume of gas separated from the liquid in the low pressure vessel. A first gas outlet means is in communication with the volume of gas above the level of liquid in the high pressure vessel, and a second gas outlet means is in communication with the volume of gas above the level of liquid in the low pressure vessel. A first flow control means is provided in the first gas outlet means for permitting the setting of an operating pressure within the high pressure vessel, and a second flow control means is provided in the second gas outlet means for establishing a positive operating pressure in the low pressure vessel.

Yet another aspect of the invention resides in a separating system for processing drilling fluids received from a borehole through a delivery pipe and wherein the system includes a first stages high pressure vessel having a fluid inlet means for receiving fluid from the delivery pipe and a liquid outlet means. The system further includes a second stage, horizontal, low pressure vessel defined by an elongated cylindrical outer shell, the low pressure vessel having a liquid inlet means. A first level control means is provided in the high pressure vessel for maintaining a level of separated liquid in the high pressure vessel to thereby provide above the level a space for containing a volume of gases separated from the drilling fluids. The system has means for conducting liquids from the liquid outlet means of the high pressure vessel to the liquid inlet means of the low pressure vessel, and there is provided a second liquid control means in the pressure vessel for maintaining a level of liquids in the low pressure vessel so as to provide above the level of liquids in the low pressure vessel a space for containing a volume of gases separated from the liquids in the low pressure vessel. A heating device is provided which includes a jacket defining a chamber for containing a heated medium in contact with a portion of the elongated cylindrical outer shell defining the low pressure vessel for transfer of heat into the liquid in the low pressure vessel.

Further, in a preferred embodiment there is provided a length of tubing disposed in and exposed externally to the fluid in the high pressure vessel. A heated medium conducting means is provided for forcing heated medium from the chamber of the heating device through the tubing in the high pressure vessel so that heat is transferred from the heated medium to the fluid in the high pressure vessel.

BRIEF DESCRIPTION OF THE DRAWINGS

In the, accompanying drawings which show various features of the present inventions by way of examples.

DESCRIPTION OF A PREFERRED EMBODIMENT

Figure 1:
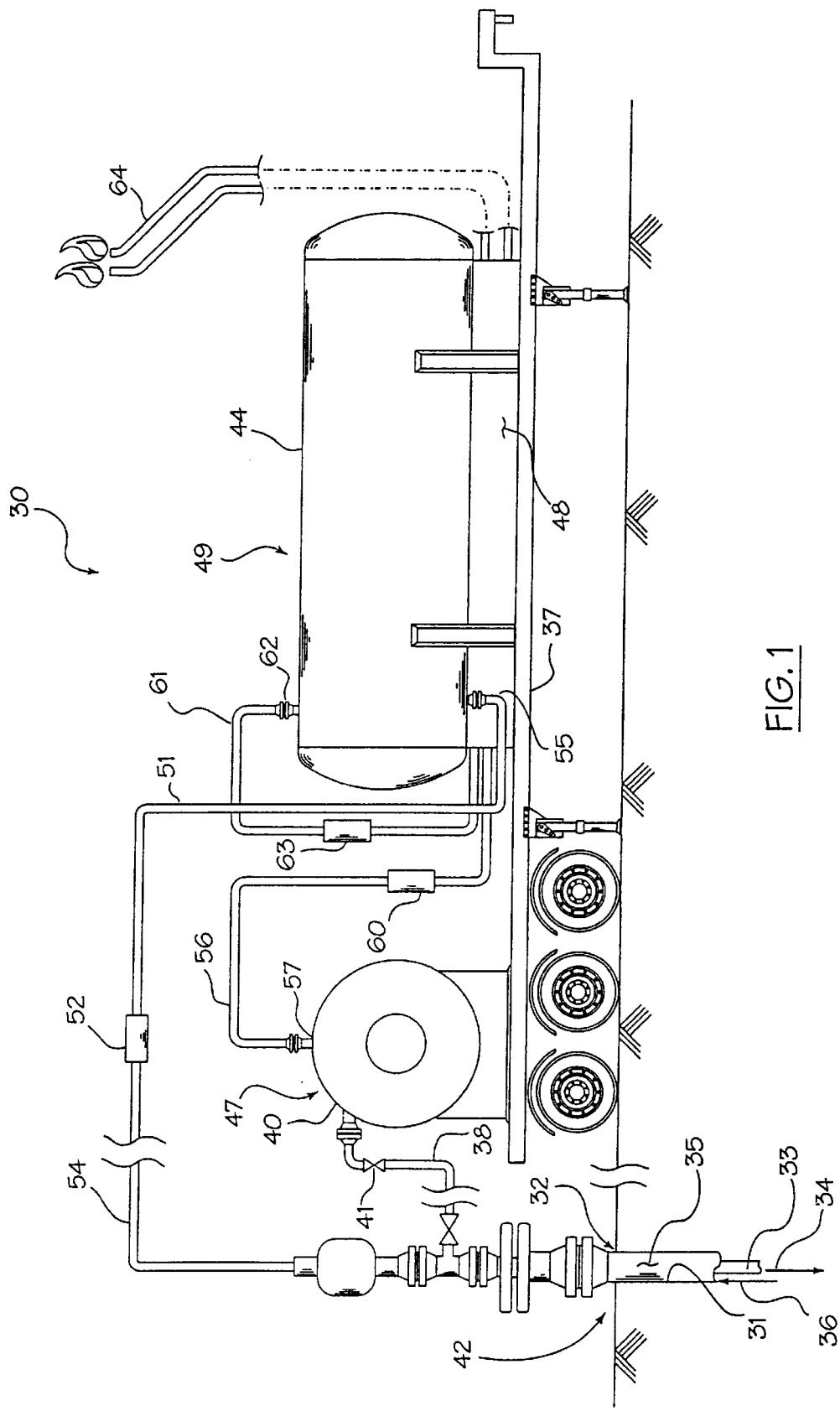
FIG. 1 is an elevational view illustrating a system according to this invention as set up for operation adjacent a borehole, much of the pipe work necessary for conducting the fluids and liquids being processed by the system being removed for simplicity.

Referring to FIG. 1, there is illustrated generally at 30 a separation apparatus or system according to the present invention and wherein the system is set-up on site adjacent a borehole 31 of a well 32 being drilled. The system is shown as being built in a mobile form so that it can be moved from site to site for use particularly when under-balanced drilling is being carried out. While the system 30 is shown as being mounted on a wheeled flat bed trailer 37, it may also be mounted on a skid arrangement if, for example, it would appear that the system may not have to be frequently moved significant distances.

As earlier described, under-balanced drilling usually results in a superior producing well. In utilizing an under-balanced system, it is a common practice to turn the downhole drilling operation from the vertical borehole 31 shown in FIG. 1 and to continue drilling downhole substantially horizontally into the underground reservoir zone (not shown) to thereby maximize exposure of the drill hole to the formation containing the hydrocarbons to be recovered. Once -the borehole is turned from the verticals the driving of the drill bit is usually accomplished by way of the drilling fluid being forced down the drill tube, the flow of fluid being depicted in FIG. 1 by the arrow 34 through a drill tube 33. The drill fluid, after providing the drive to the cutter bit of the drill, (not shown), passes back up a well casing 35 in the annular space between well casing 35 and the drill tube 33, the drill cutting being carried in the drill fluids as indicated by arrow 36. The system 30 of the present invention is set up at a distance from a well-head area 42, which also includes the associated drilling rig equipment which has not been included in FIG. 1 for the sake of clarity.

As previously described, in under-balanced drilling, the fluid 34 being pumped into the drilling location of the borehole, and in the case of horizontal drilling, also utilized to drive the drill bit, is maintained at a downhole pressure of a lesser value than that existing in the formation surrounding the borehole at the drilling location. Having established the pressure in the formations the selection of the fluid to be pumped into the well is determined by calculating the pressure which will be provided in the drilling area for the particular depth of well involved. For example, for a 5,000 foot depth borehole, based on the densities of water or an oil, such as diesel oil, water would provide a downhole pressure of 2165 p.s.i.g, while diesel oil provides a downhole pressure of 1750 p.s.i.g. Thus, if the pressure in the surrounding formation of the drilling area is determined as being 2,000 p.s.i.g., it can be seen that diesel oil would be utilized rather than water, to provide an under-balanced condition. In the event, the formation pressure is considerably less than the example above or if due to a greater depth of the borehole, the column of fluid is heavier, so that the column of diesel oil is not significantly less than the formation pressure, it is a known practice to insert gas, such as nitrogen into the diesel oil to reduce its density. Thus, the column of fluid in the well could be established to provide a pressure of the drilling location of a lesser value of that in the formation.

In the event the fluid being pumped into the drill tube 33 is diesel oil, the fluid will pick up, of course, the drill cuttings so that the returning fluid, as shown at 36, will include such solid particles. In some instances a gel compound is added to the fluid entering the drill tube to establish a different characteristic for the fluid, such as a better capability of carrying the drill cuttings back up to the surface in the drill fluid 36. Moreover, it is also common for water from the surrounding formations to join the drilling fluids, and the under-balanced condition also encourages gases and oil to exit the formation and form part of the drill fluids 36 returning to the separation system 30 of the present invention. As the system 30 is closed and thereby prevents the escape of the gases in the fluid from escaping to the atmosphere, the system 30 must be capable of coping with significant fluctuations in the pressure of the returning fluid 36 as well as providing the separation of the gases and drill cuttings from the liquids and further separating the liquids so that a separated oil is available for returning to the drill tube.

In the system 30, the returning fluids 36 flow from their annular passage in the borehole out through a delivery pipe 38 to a high pressure vessel 40 which forms a first stage 47 of the separating system. The delivery pipe 38 includes a choke valve means 41, which under certain conditions, may be closed or partially closed to completely shut off or to affect the flow from the borehole 31 to the separating system 30.

As will be described in more detail below, the high pressure vessel 40, which is in the form of a closed horizontal cylindrical tanks contains a separator means 43, (FIG. 2), in a first chamber 70 thereof which separates from the incoming drill fluid 36 a major portion of the drill cuttings and gases. The separation of the liquids is further achieved in following second and third chambers 91 and 94, in the high pressure vessel 40, before the liquids separately exit the high pressure vessel 40. The separate liquids are then metered by meters 104 and 105, recombined, heated by a heating device 48 and conducted to a second stage 49 provided by a low pressure vessel 44 which is a horizontal tank in the form of an elongated cylindrical outer wall or shell 53. A final separation of the liquids occurs in a second stage 49, and further separations of gases and solid materials are also carried out here. In the example of the drilling conditions described above, the oil separated at the second stage 49 is delivered from an outlet means 55 to a flow control means 52 located at the rig site via pipe 51 and this oil is returned to the interior of the drill tube 33 via a pipe 54.

The separated gases exit from the two vessels 40 and 44 and may be conducted to a flare stack 64. The gas exits the high pressure vessel 40 via a pipe 56 through an outlet means 57 and includes a flow control means 60 for permitting a setting of the operating pressure within the high pressure vessel 40. The gas exiting via pipe 56 is passed through the heating device 48 before leaving the system 30. While the flow control means 60 is preferable in the form of an adjustable back pressure valves the flow control may actually be performed by the gas entering a gas gathering system or by the back pressure of a gas compressor functioning as a pressure booster. The gas exiting from the low pressure vessel 44, by way of pipe 61 from a gas outlet means 62, is preferably also heated by way of pipe 61 passing through the heater device 48, and the magnitude of the flow is controlled by a separate flow control means 63 which may be of the same nature as that described in relation to flow control means 60.

As indicated above, the pressure within high pressure vessel 40 is determined by the setting of the flow control means 60 in gas outlet pipe 56, which in turn-governs the flow of fluid 36 through the delivery pipe 38 into the high pressure vessel 40. Thus, during normal operating conditions, the choke valve means 41 may be maintained in its fully open condition. This avoids, therefore, a high rate of erosion as normally occurs due to the presence of the drill cuttings in the fluid 36 and the large pressure drop due to the choking action of the valve as it would normally be used to determine the rate of flow from the well. Also the previously described problems due to the formation of hydrates during such choking of the flow are also avoided.

Taking into account that common well head flowing pressures are in the order of 50–500 p.s.i.g., the high pressure vessel 40 is designed for operating pressures of 50–200 p.s.i.g. with a maximum operating pressure preset at 500 p.s.i.g., but higher maximum operating pressures may be increased, for examples to 1,500 p.s.i.g. As shown both the high pressure vessel 40 and the low pressure vessel 44 are p elongated horizontal cylindrical vessels with outwardly curved ends, and preferably the low pressure vessel 44 is considerably longer than the high pressure vessel 40.

A weir 66 extends transversely across the high pressure vessel 40 a distance inward from a first end 67 of the high pressure vessel 40 so as to define adjacent that end of the vessel the first separating chamber 70 which receives delivery of the well fluid 36 from pipe 38 to inlet means 71. The weir 66 has a horizontal upper edge 72 over which the liquid must flow from the first chamber 70 to the second separating chamber 91. Connected to the inlet means 71 is the separator means 43 which is located in the first chamber 70. The separator means 43 is provided to separate a major portion of the solids, which are, in the main, the drill cuttings, and also to separate a significant amount of the gaseous components from the liquids which may include waters oil and other liquid petroleum products.

Figure 2:
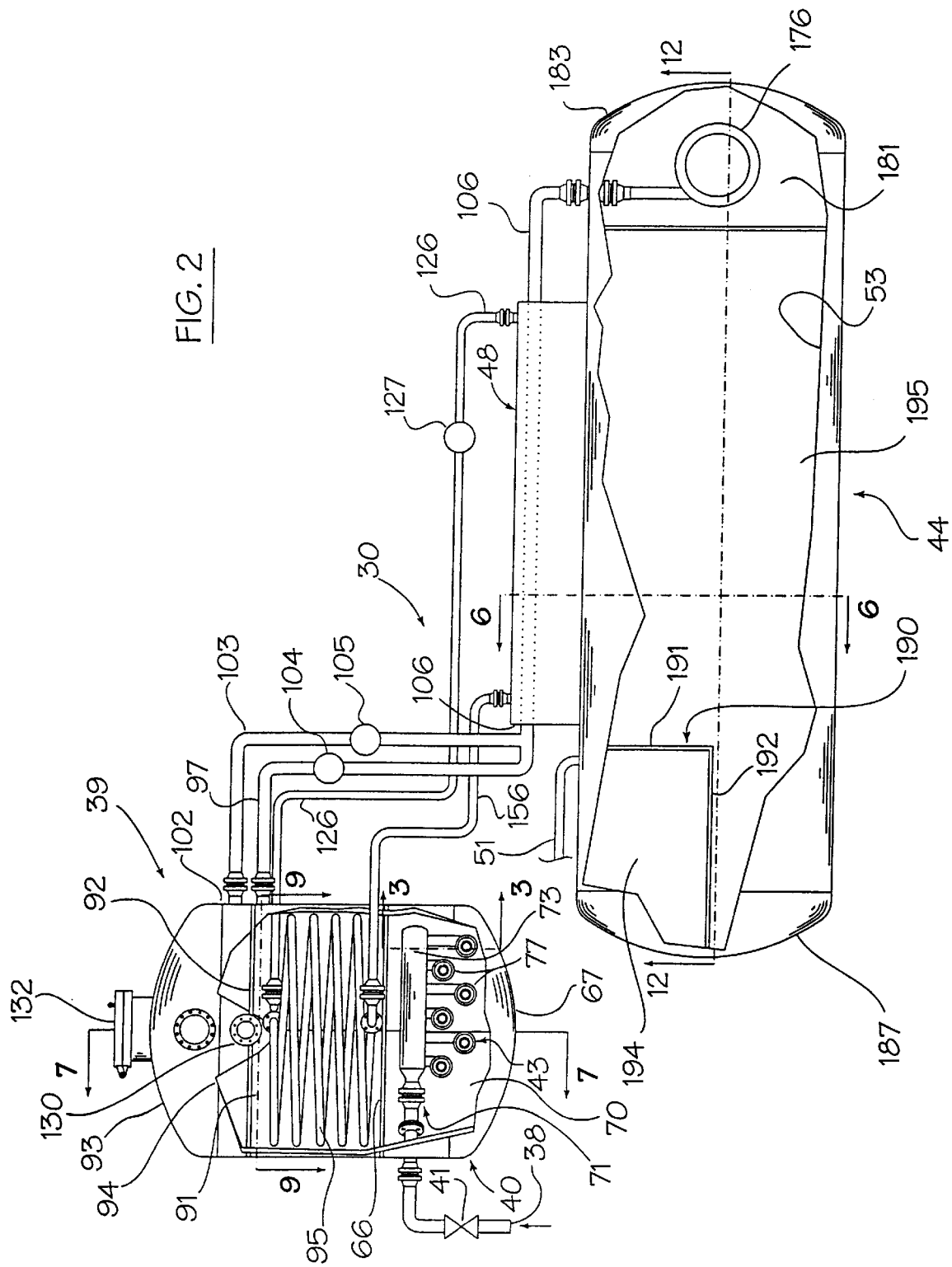
FIG. 2 is a plan view of the high and low pressure vessels included in the present invention with portions of the vessels cut away to show the interiors thereof and also showing in a somewhat schematic manner certain conduits used in the transfer of the liquids in the system.
Figure 3:
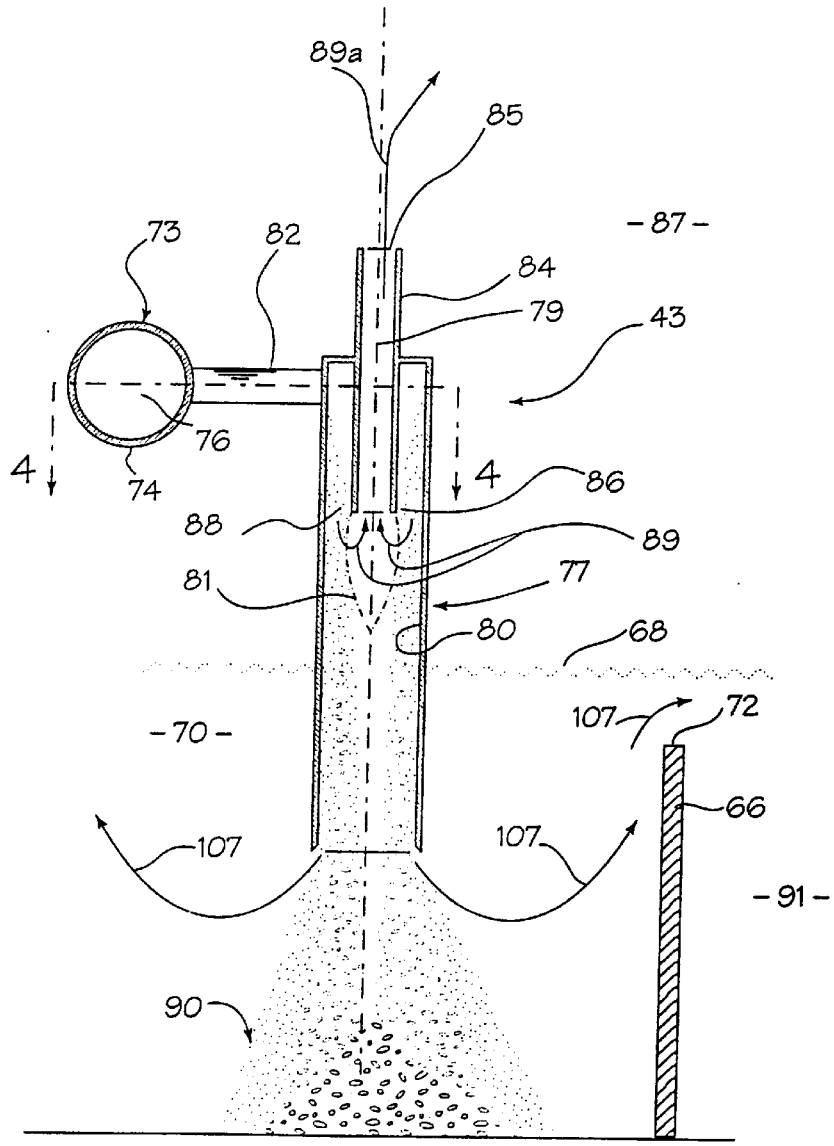
FIG. 3 is an enlarged cross sectional view of a separator means in the form of a vortex separator as seen from line 3—3 of FIG. 2 and illustrating the main separator means according to the present invention.
Figure 4:
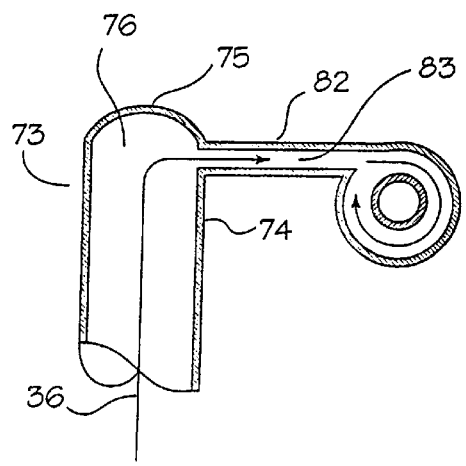
FIG. 4 is a cross sectional view through the main separator means as viewed from line 4—4 of FIG. 3.

Referring to FIGS. 3 and 4, the separator means 43 includes a main manifold portion 73 which is in the form of a horizontal, elongated tubular member 74 having its interior in communication at an inner end with the inlet means 71 so as to receive fluid 36 directly from delivery pipe 38. The outer end 75 of the tubular member 74 is closed so as to form an interior manifold chamber 76. Disposed beside the manifold portion 73 are a plurality of separate housing means 77 which may be of identical form. As best seen in FIG. 2 the individual housing means 77 are arranged along one side of the manifold portion 73 and in two rows in which the housing means 77 are staggered so as to be able to accommodate six housing means. Depending on the space available and the relative size of the housing means 77, any number of such housing means 77 may be provided, and alternatively two sets of housing means, one set on each side of the manifold portion 73, could be utilized. Each housing means 77 has an inner cylindrical wall 80 defining a swirl chamber 81, the central axis 79 of the cylindrical wall 80 being disposed vertically. Each housing means 77 is affixed to the tubular member 74 forming the manifold portion 73 by way of a tubular connector member 82. The tubular member 82 is in communication at one end with the manifold chamber 76 at an inner end and with an upper portion of the swirl chamber 81 at an outer ends thus providing a fluid passage 83 from the manifold portion 73 to the upper end of the swirl chamber 81.

A lower end 78 of the swirl chamber 81 is opens and during operation, the lower end 84 of the housing means 77 is disposed below a liquid level 68 of the first separating chamber 70. A vertical tubular portion 84 of the housing means 77, which is open at opposite ends, extends through the otherwise closed upper end of the housing means 77 and terminates in an upper open gas outlet end 85 above the separator means 43. The tubular portion 84 has a lower gas inlet end 86 below the upper end of the swirl chamber 81. Thus, as the fluid 36, which is at a pressure in the manifold chamber 76 higher than the internal pressure within the high pressure vessel 40, is expelled through the fluid passage 83 and into the swirl chamber 81, the rotating motion of the heavier solids 88 and liquids carries these components through the open lower end of the housing means 77 into the portion of the first separating chamber 70 below the separator means 43. To ensure an effective swirl is imparted to fluid entering the upper part of the chamber which, in cross section is in the form of an annulus surrounding tubular portion 84, the fluid passage 83 joins the annulus in a longitudinal direction as best seen in FIG. 4. The lighter gas denoted by the arrows 89 escapes from the swirl of liquid and solid particles 88 and is forced to the central portion of the swirl chamber where it is able to escape upwardly through the tubular portion 84 as indicated by arrow 89a to join the volume of gas 87 separated from the fluid and located above the liquid level 68 in the high pressure vessel 40. The swirl mixture of drill cuttings or particles 88 and liquids-being expelled out the lower of the housing means 77 enters the liquid surrounding the lower end of the housing means, and a majority of the heavier drill cuttings, and particularly the coarser particles, continue towards the bottom of the first separating chamber 70 and accumulate there, as indicated at 90. The liquids as indicated by arrows 107, on the other hands reverse direction outside of the housing means 77 and flow towards the upper level of the liquid in the first separator chamber and overflow the upper edge 72 of weir 66 to enter the second separating chamber 91.

Figure 7:
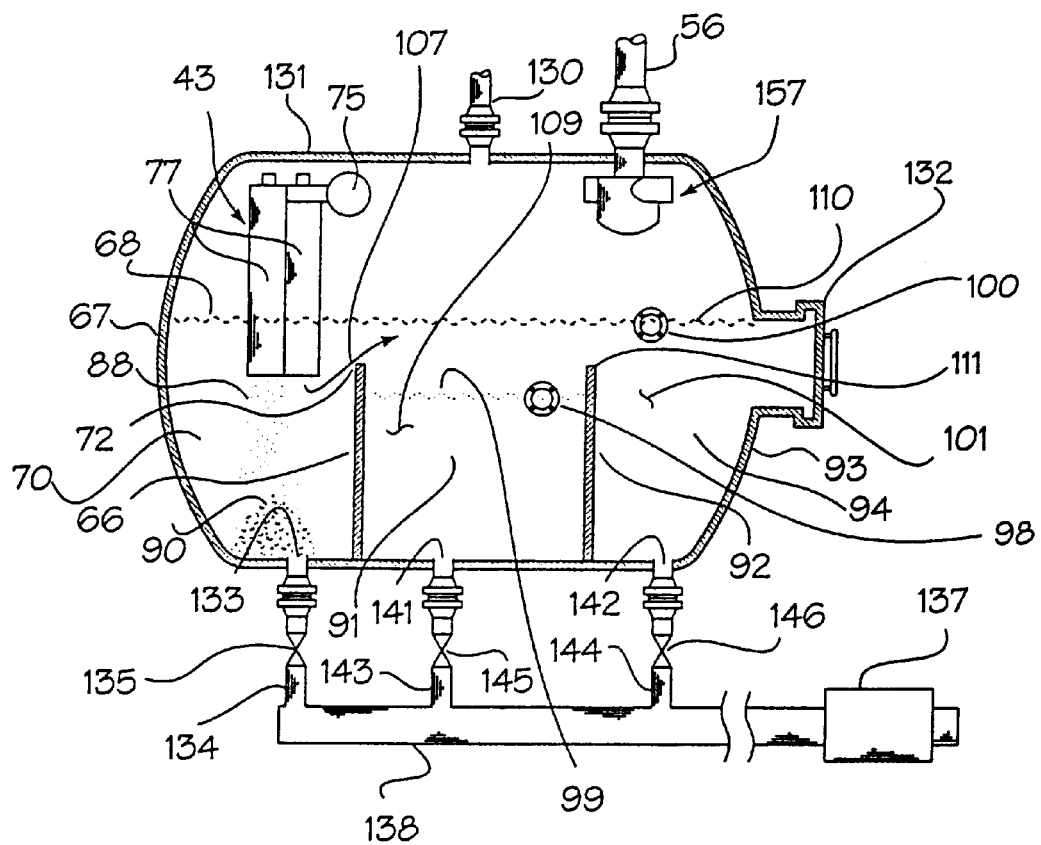
FIG. 7 is a longitudinal cross sectional view through the high pressure vessel as seen from line 7—7 of FIG. 2, again with certain ports removed for the sake of clarity.

The second separating chamber 91 in the high pressure vessel 40 is defined between the weir 66 and a second weir 92 which is spaced inward from a second end 93 of the high pressure vessel 40, the upper liquid level in this chamber being substantially the same as that in the first separating chamber 70. A third separating chamber 94 is defined between the weir 92 and the second end 93 of the high pressure vessel 40. As the liquids from the first chamber 70 pass over the weir 66, the liquids become less turbulent, and as a result some of the finer solid particles still remaining in suspension settle to the bottom. The height of the second weir 92 assists in retaining the solid particles in the second separating chamber 91. In the second chamber 91 there is also substantial separation between the different liquids. Thus, in the example suggested above, the water 109 content settles out below the lighter oil 101 and is retained in the second chamber 91. To assist in the separation in the second chamber 91 there is provided internally of the high pressure vessel 40, a heating means 95 which will be described in further detail below. Located within separation chamber 91 is a water level sensing means 98 which is utilized to control water outlet means 96 in a water outlet pipe 97 of the high pressure vessel. The sensing means 98 which is preferably of the float type is disposed and calibrated for maintaining the level 99 of the water in the second separating chamber 91 below an upper edge 111 of the second weir 92 so that the oil which collects above the heavier water flows over the weir 92 and collects in the third separating chamber 94. The level 110 of the oil collected in the third chamber 94 is sensed by a level sensor 100, (FIG. 7) and the level thus sensed is used in oil outlet means 102 (FIG. 8) which regulates the flow of the oil 101 from third chamber 94 though an oil outlet pipe 103 (FIG. 2). Again in the third chamber 94 of the high pressure vessel 40, because of the lack of turbulence, additional fine cuttings may settle to the bottom of the chamber.

Located in the water outlet pipe 97 and the oil outlet pipe 103 there are provided water meter 104 and oil meter 105, respectively The readings from the meters 104 and 105 provide important information regarding the proportions of water and oil in the drilling fluid returning from the well which is used in the drilling operation. Subsequent to being metered, the liquids passing through pipes 97 and 103 are recombined in pipe 106 which passes through heating device 48 before entering the second stage of separation in low pressure vessel 44.

Figure 5:
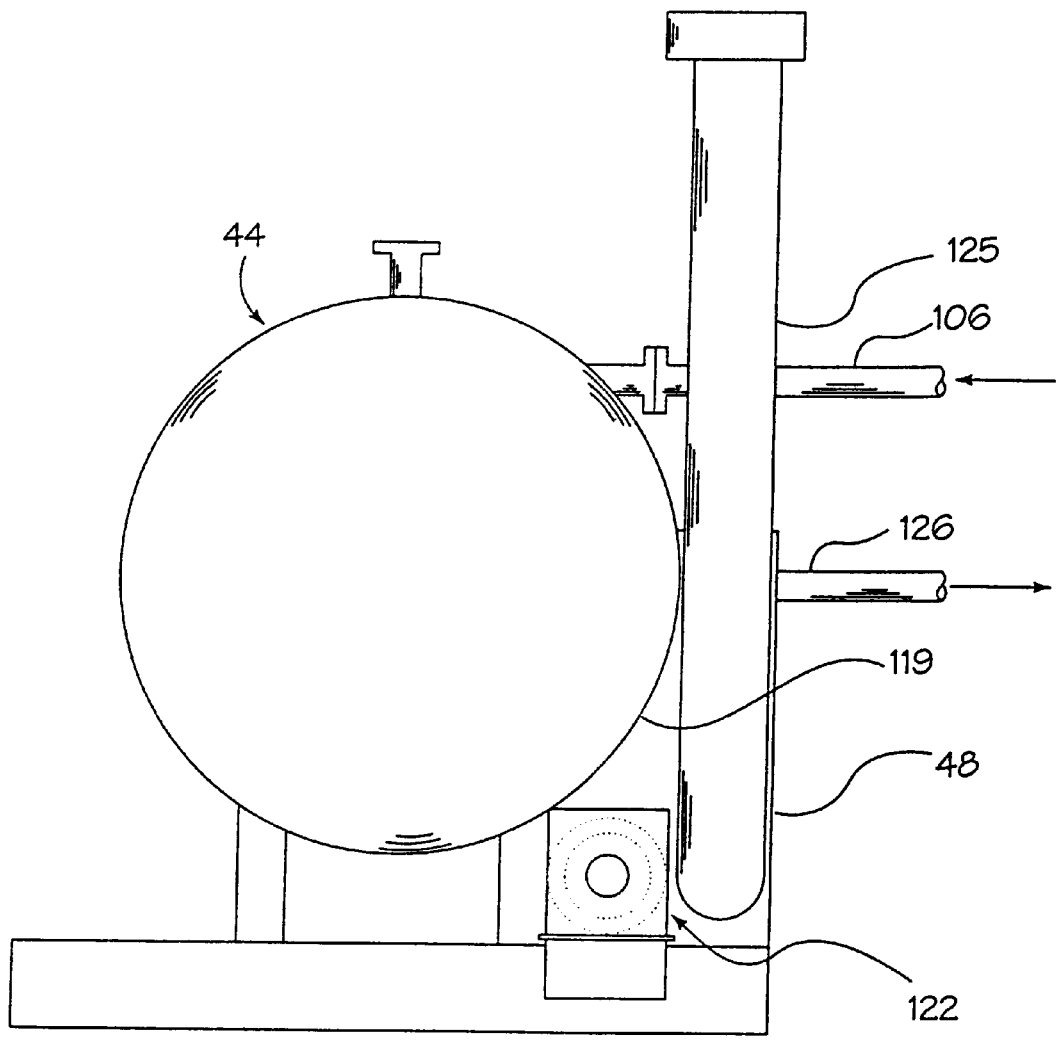
FIG. 5 is a view from the right hand end of the low pressure vessel as seen in FIG. 2, and with the heating device in place.
Figure 6:
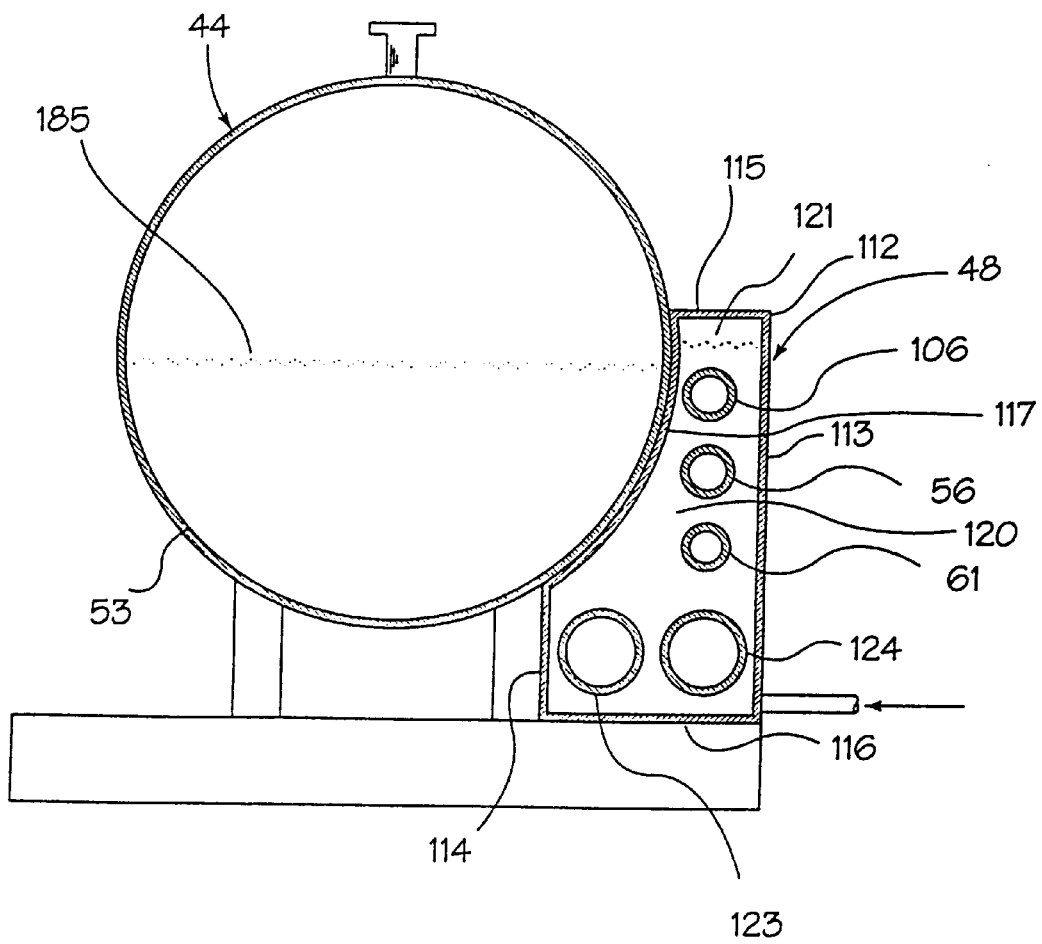
FIG. 6 is a cross section view through the low pressure vessel and the heating device as seen from the line 6—6 of FIG. 2.

Referring to FIGS. 5 and 6, details of the heater device 48 are shown. The heater includes a sheet steel outer jacket 112 having an outer vertical side plate 113, and a shorter inner vertical side plate 114, a horizontal top plate 115 and a horizontal bottom plate 116. The inner edge of the plate 115 and the top edge of side plate 114 are affixed to the outer surface of the outer cylindrical shell 53 of the low pressure vessel 44 so that the arcuate section 117 of the shell 53 together with side plates, and the top and bottom plates, as well as opposite end plates 119 define a closed heater chamber 120 which contains a heating medium 121, such as water. The arcuate section 117 of the shell 53 thus forms a wall portion of the vessel 44 through which the heat of the medium 121 in the chamber 120 can be transferred directly into the fluids within the low pressure vessel 44. As may be observed from FIGS. 1 and 2, the jacket 112 of the heater device 48 extends for a substantial length of the low pressure vessel 44 so that it has the ability to transfer a significant amount of heat directly into the vessel 44. At one end of the jacket 112 there is located a burner unit 122 (FIG. 5), which, for examples burns propane so as to produce hot combustion gases which are conducted via a tube 123 (FIG. 6) through the length of the jacket. The tube 123 reverses at the opposite end and communicates with a tube 124 which conducts the combustion gases back to the first end where they escape to atmosphere through an exhaust stack 125. The heat from the combustion gases is thus transferred to the heating medium 121 within the jacket, and as explained a portion of this heat is transferred directly to the fluids within the low pressure vessel 44. Also, as explained above, the pipes 56 and 61 carrying the gases collected above the liquid levels in the high pressure vessel 40 and the low pressure vessel 44, respectively also pass through the length of the jacket 112 within the heated medium whereby the gases therein are heated on the way to the flare stack 64 or alternative systems. Thus, problems which might otherwise be caused by the formation of hydrates in the delivered gases are reduced. Moreover, as previously indicated the pipe 106 transferring the recombined liquids collected from the high pressure vessel 40 to the low pressure vessel 44 is also further heated even before entering the low pressure vessel 44. This aids in the subsequent separation of the varying fluid densities.

The outer jacket 112 of the heating device 48 is provided with an outlet (not shown) with which a pipe 126 (FIG. 2) is in communication and feeds heated medium to a circulatory system for heating the well fluids entering high pressure vessel 40. The pipe 126 is provided with a pump 127 (FIG. 2) for forcing the circulation in the system. In addition to providing the heated medium to the internal heating means 95 within the high pressure vessel 40, the pipe 126 may provide heated water pumped by the pump 127 for external use such as washing down the equipment and for providing sparging nozzles within the vessels 40 and 44 with pressurized heated water. It is necessary, of course, to provide an inlet means (not shown) for adding top-up water to the jacket 112 when water is used as the heating medium and heated water is used for other purposes.

The high pressure vessel 40 is also formed from an elongated outer cylindrical shell or wall 131, (FIG. 7) which normally would not have the same length as the outer shell 53 of the low pressure vessel 44, and the opposite ends of the cylindrical shell are closed with outwardly curved ends 67 and 93. In the end 93, the high pressure vessel 40 is provided with a manway 132, which, when open, allows access to the interior of the vessel for maintenance purposes. In addition to the gas outlet means 57 in the top of the high pressure vessel 40, the high pressure vessel 40 is provided with an outlet means 130 which is provided with a pressure relief valve (not shown).

Figure 8:
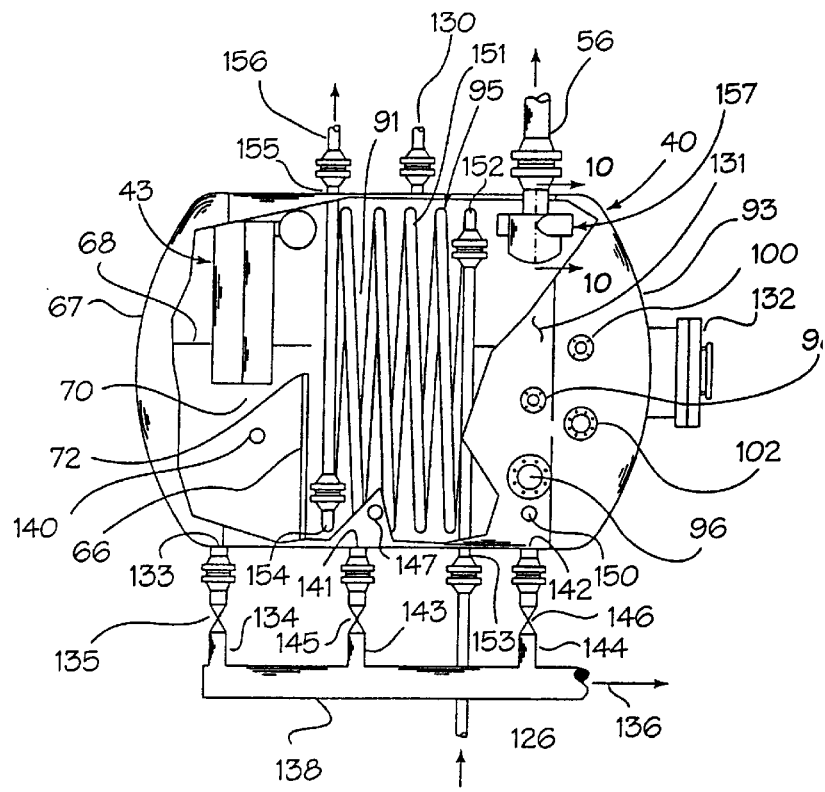
FIG. 8 is a side view of the high pressure vessel which has been broken away to show interior components.

As previously described, a major portion of the drill cuttings or solid particles 90 collect beneath the main separator means 43 at the bottom of the first separating chamber 70 (FIG. 3). There is provided at the very bottom of chamber 70 below separator means 43, an outlet means 133, which is in communication with a pipe 134. A control valve, 135 is provided in pipe 134 which is connected at this lower end to a solids discharge pipe 138. Therefore, as valve 135 is opened when the pile 90 of particles reaches a predetermined maximum the particles can be removed through the pipe 138 as indicated by the arrow 136 (FIG. 8). The particles and liquids mixed therein may be drawn off with a pump 137, such as a progressive cavity pump, the inlet of which is connected to pipe 135. The outlet of the pump may be connected to a conduit which directs the particles to a disposal area. There are located in the walls of the high pressure vessel 40 adjacent to the chamber 70 sparging nozzles, 140, as indicated in FIG. 8, these nozzles being directed so as to provide a scrubbing action at the bottom of the chamber 70 for assisting in the removal of the particles in chamber 70 and directing the particles towards the outlet means 133. The sparging nozzles 140 may be provided with pressurized heated water from heating device 48, for example by pipes (not shown) from the output of pump 127, or alternatively from a water outlet 199 of the second state 49.

As previously described, finer particles also settle in the less turbulent liquids in chambers 91 and 94 of the high pressure vessel 40, and these particles and other sludge which collect at the bottoms of chambers 91 and 94 can be separately removed through outlet means 141 and 142, respectively. Outlet means 141 and 142 are also connected to particle discharge pipe 138 via pipes 143 and 144, which also include control valves 145 and 146 (FIG. 8), respectively. Again in the area of the lower part of each of chambers 91 and 94, there are provided in the outer cylindrical shell 131 of high pressure vessel 40 sparging nozzles 147 and 150 (FIG. 8) for use in flushing the sediment in chambers 91 and 94 down the outlet means 141 and 142, these sparging nozzles also being supplied with pressurized water by lines (not shown) from pump 127.

Figure 9:
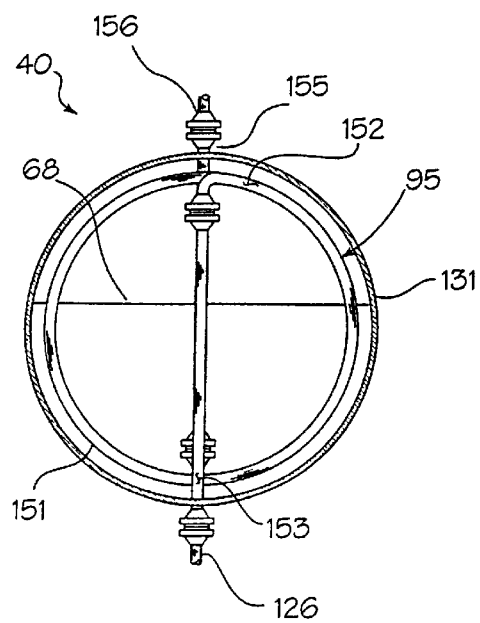
FIG. 9 is a cross sectional view through the high pressure vessel as seen from line 9—9 of FIG. 2.

The heating means 95 which is in effect a heat transfer means shown in FIGS. 2, 8 and 9 is formed of a large coiled tubular member 151 of cylindrical form having an outer diameter slightly smaller than that of the interior of the outer cylindrical shell or wall 131 forming high pressure vessel 40. Accordingly, more than one half of the exterior of the coiled tubular member is exposed to the liquid in the second chamber 91 of the high pressure vessel 40, while a significant portion of the coiled tubular member is also exteriorly exposed to the volume of gas 87 above the level of the liquids. Thus, not only is heat transferred to the liquids, but the gas is at least initially heated before passing out through the gas outlet means 57. Thus, the medium in the jacket 112 which is continuously heated is continuously circulated via pump 127 through the coiled tubular member 128 to heat the fluids in the high pressure vessel 40. The heated medium from the heating device 48 is pumped to the coiled tubular member 151 via pipe 126 which is attached to a first end 152 of the coiled tubular member by way of a feed pipe 153 which passes through the bottom of the high pressure vessel 40. A second end 154 of the coiled tubular member 151 is attached via an outlet pipe 155 which exits through the top of the high pressure vessel 40 to a return pipe 156 which returns to the jacket 112 of the heating device 48.

Better separation of the liquids from each other and the gas from the liquid occurs as the liquids are heated as a result of the heating means 95 in the high pressure vessel 40. Thus, gases separation not only occurs because of the operation of the main separator means 43, but they continue to escape from the surface of the liquids along the complete length of the high pressure vessel 40. In the event gel is added to the fluid being pumped into the well for the purpose of giving the fluid more ability to carry the drill cuttings back to the separating system, the heating of the liquids facilitates the release of the drill cuttings from the gel in both the high and low pressure vessels.

As compared to known heating arrangements used in separating systems, wherein the incoming drill fluids are heated immediately prior to and after the fluid passes through the choke valve of the pipe corresponding to the delivery pipe 38 of the present inventions the heating system of the present invention does not involve the passing of the abrasive incoming drill fluids through a heat transfer device. In the present invention the choke valve means 41 is normally maintained in a fully open position and the drill fluids containing the drill cuttings pass directly to the main separator means 43 where a substantial proportion of the drill cuttings are removed. The fluids are then subsequently heated by means which permits effective transfer of heat to the fluids at different locations so as to achieve more effective separation in both the high pressure vessel 40 and the low pressure vessel 44, Also the form of the heating system in the present invention provides for a convenient method of heating the separated gases to avoid the formation of hydrates in the gas leaving the separation system.

Figure 10:
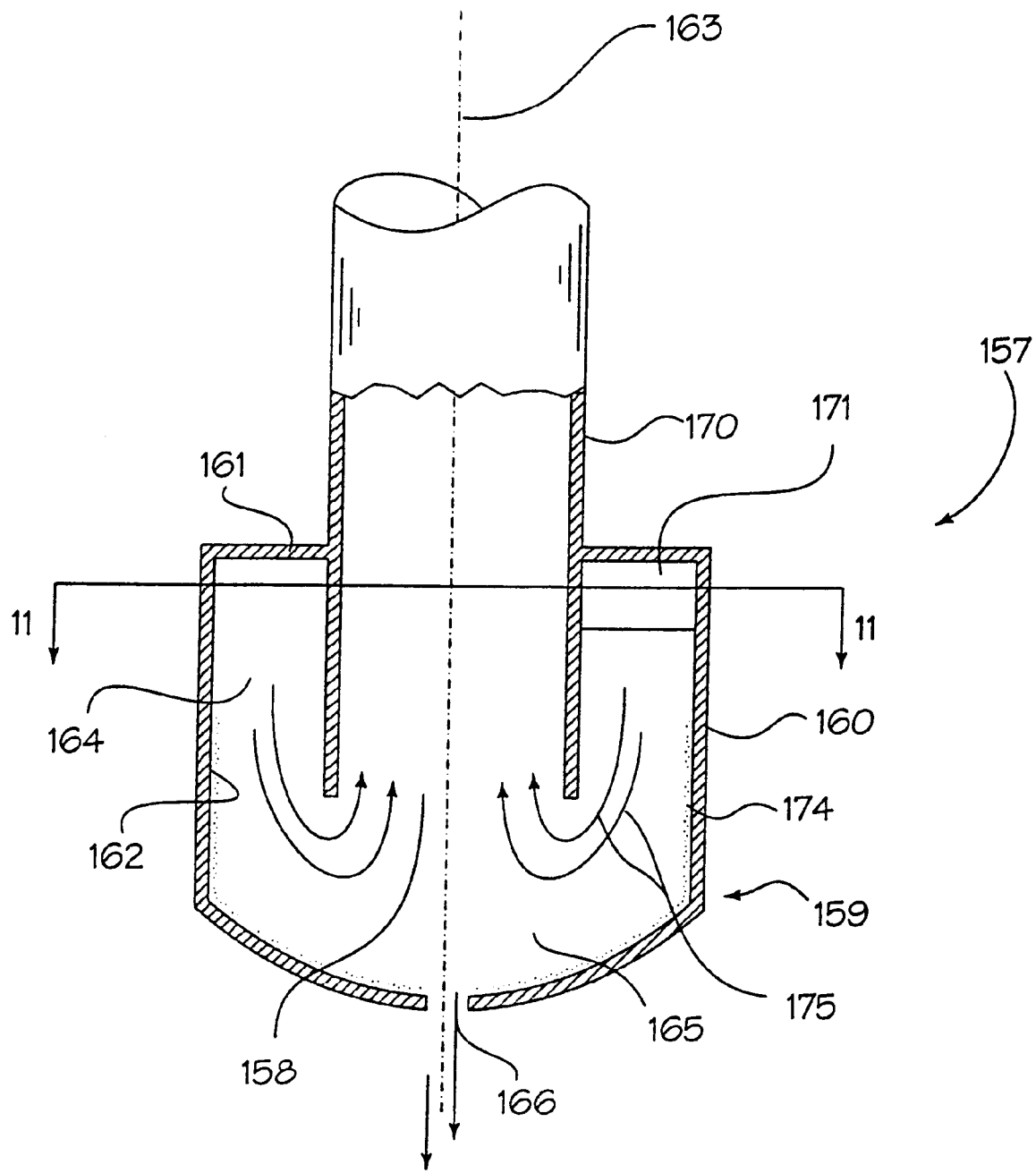
FIG. 10 is a cross sectional view through a part of a gas outlet means used in both the high and low pressure vessels as seen from line 10—10 in FIG. 8 and showing a de-misting device for removing liquid particles from the gas leaving the vessels.
Figure 11:
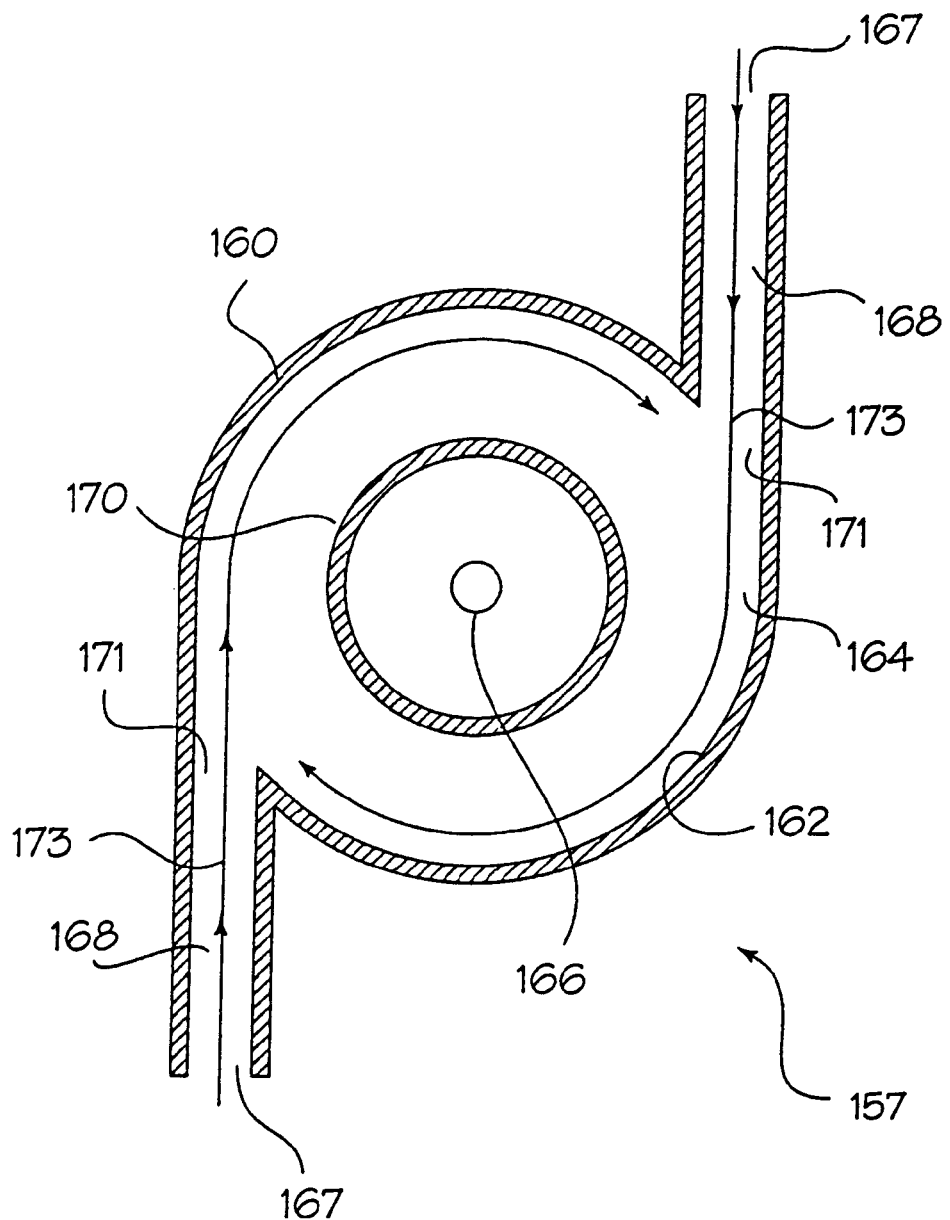
FIG. 11 is a cross sectional view of the de-misting device as seen from line 11—11 of FIG. 10.
Figure 12:
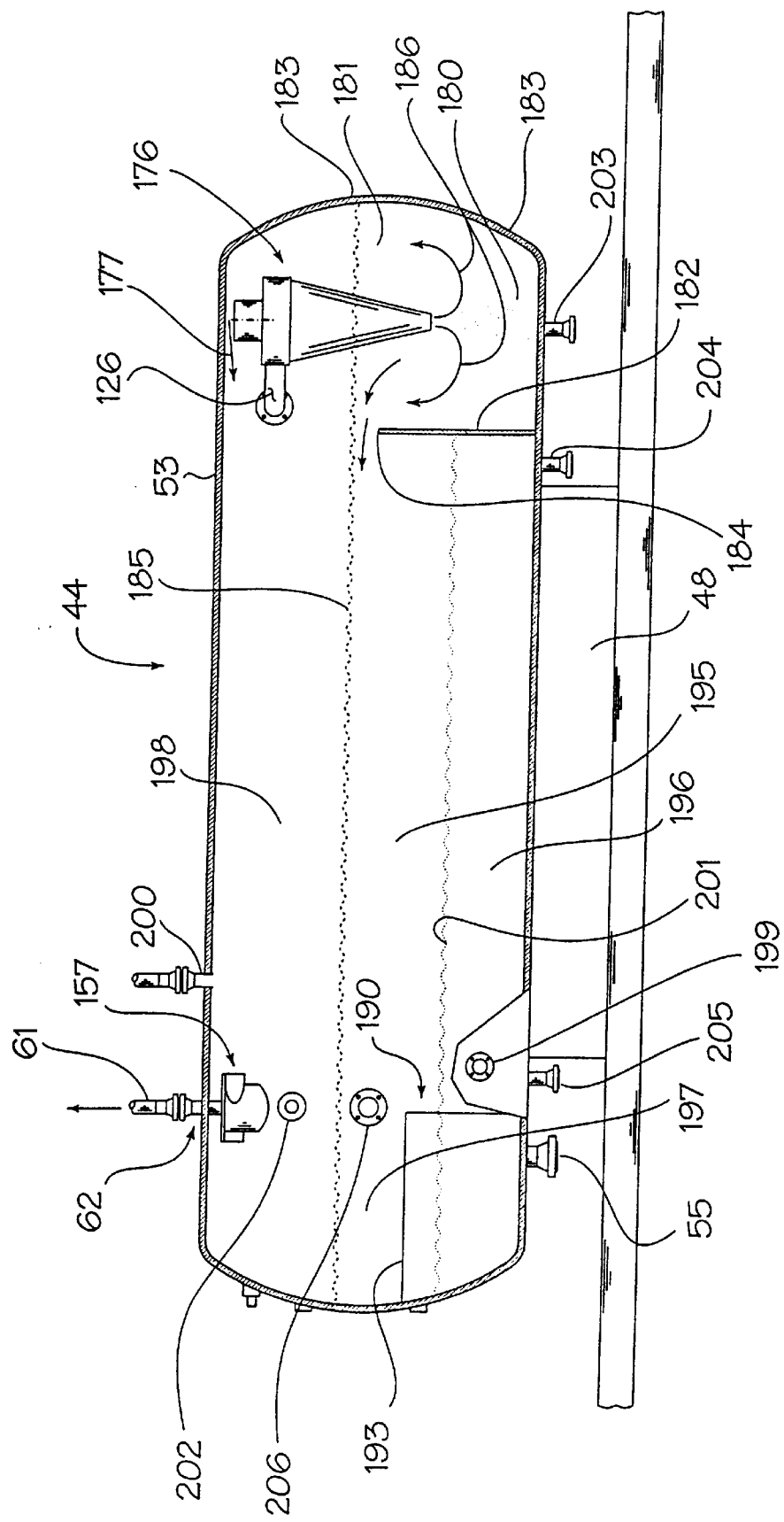
FIG. 12 is a longitudinal cross sectional view through the low pressure vessel as seen from the line 12—12 of FIG. 2, with certain parts removed for the sake of clarity.

In FIGS. 10 and 11 there is shown a de-misting device 157 which forms part of the gas outlet means 57 of the high pressure vessel 40. The de-misting device 157 also forms part of the gas outlet means 62 of the low pressure vessel 44 as is shown in FIG. 12. The separating process within both vessels results in a considerable amount of mist, i.e., tiny particles of liquid, being carried by the escaping gases into the volume of gas above the level of the liquid, such as the volume of gas 87 in the high pressure vessel 40. It is desirable, of course, that the mist not be carried into either of the pipes 56 or 61 and the de-mister provides an effective way of separating the liquid from the escaping gases and returning it to the liquid in the lower part of the vessels. The de-misting device 157, as used in gas outlet means 57, for example, provides communication between the volume of gas 87 and the pipe 56 and is disposed above the level of the liquids in the high pressure vessel 40. The de-misting device 157 includes a housing means 159 in the form of a bowl-shaped housing portion 160 with a closed flat top 161. The housing portion 160 forms an inner wall 162 providing an upper substantial cylindrical chamber 164 about a vertical axis 163 of the device. The lower part of the housing portion 160 provides a lower part 165 of the chamber 164. The chamber is substantially closed except for a small moisture outlet 166.

A tubular portion 170 of the de-misting device has an open lower end 158 well below the top of the housing, and the tubular portion extends upwardly through the otherwise closed top 161 of the chamber 164. Above the device, the tubular portion communicates with the pipe 56. As shown the de-misting device is provided with a pair of like gas inlet means having open outer ends 167, and passages 168 extending from the open outer ends 167 through to inlet openings 171 at the top of the chamber 164, the passages approaching the upper portion of the chamber 164 in a substantially tangential manner.

As the gas flows into the upper part of the chamber 164 about the tubular portion 170 as indicated by arrows 173 (FIG. 11), it swirls in the annular space between the tubular portion 170 and the inner wall 162 so that the heavier liquid particles are thrown outwardly by centrifugal force to the wall 162, and due to gravity run down the wall as indicated at 174 (FIG. 10), and flow out through the opening 166. The gas turns sharply at the bottom of the vortex formed by the swirling gas and exits into the pipe 56 as indicated by arrows 175. The sharp turning of the gas throws most of the residual moisture particles to the bottom of the housing portion 160.

While both the high pressure vessel 40 and the lower pressure vessel 44 are both of the horizontal type, the liquid capacity of the lower pressure vessel 44 is of considerably greater maximum capacity than the high pressure vessel 40. As an example, the high pressure vessel 40 may have a maximum capacity of 50 barrels, while the low pressure vessel 44 may have a maximum capacity to be more in the order 190 barrels. An important feature of one aspect of the invention is to provide a system which is capable of removing a major portion of the drill cuttings at an early stage of the separation of the constituents of the well fluid returned from the borehole and yet be also capable of disposing of large volumes of gases which may be rapidly released within the borehole during the drilling procedure using a under-balanced drilling method. In the system of the present invention, when high flow rates are encountered, particularly due to an increased gas production in the well, there is no disrupting of the process, such as that caused by utilizing the choke valve means 41 to decrease or even block off the return of the fluid from the well. As previously indicated, the high pressure drop across the choke valve during such choking is highly detrimental In the present system, the pressure within the high pressure vessel 40 can be maintained within the permitted maximum under most conditions encountered in under-balanced drilling by way of the flow control means 60 in pipe 56 which conducts the separated gases exiting from the high pressure vessel 40 through gas outlet means 57. The valve in the flow control means is opened further to permit the additional gases to flow otherwise unobstructed to the flare stack 64 or other system collecting the gas output of the vessels 40 and 46. As the higher quantity of gas is free to flow through the high pressure vessel 40, the liquids and drill cuttings continue to separate in the usual manner without interruption due to the excess of gas flow. The liquids and any residual solids exiting from the high pressure vessel 40 then continue on in the usual manner to the lower pressure vessel 44 for further and more complete separation After the fluids exiting from high pressure vessel 40 are metered and recombined in pipe 106, they pass through the heater device 48, where additional heat is added thereto before entering low pressure vessel 44, by way of a vortex separating means 176. While the separating means 176 may have a form similar to the separator means 43 used in the high pressure vessel 40, it is possible to use commercially available separators known as de-sanders or desilting devices. In the separating means 176, further gas is separated by way of centrifugal force caused by the swirl imparted to the liquids entering from pipe 126, and the separated gases escape through the top of the separating means as indicated by arrow 177 (FIG. 12). Also residual solid particles 180 are also separated by centrifugal force and pass out through the bottom of the separating means 176 and continue toward the bottom of the low pressure vessel in a first chamber 181 of the low pressure vessel 44. The chamber 181 is provided by a weir 182 which extends transversely across the low pressure vessel 44 at a distance inward from a first end 183 thereof. The weir 182 has a horizontal upper edge 184, and the liquids issuing from the lower end of the separating means 176, which is below an upper liquid level 185, turn back upwardly and flow over the upper edge 184, as indicated by arrows 186. The solid particles, on the other hand settle below the separating means 185 in first chamber 181.

Adjacent a second end 187 of the horizontal low pressure vessel 44 is a second weir means 190. As best seen in FIG. 2, the weir means 190 includes a first weir section 191 which extends practically across the low pressure vessel 44 and a second weir section 192 which extends in the longitudinal direction of the low pressure vessel and joins the front weir section 191 at right angles. The weir means 190, which has an upper edge 193, thus forms a box-like chamber 194 effectively in a corner of the low pressure vessels at the end of the low pressure vessel 44 opposite to the end at which the liquids are introduced via pipe 106.

Thus, there is provided between weir 182 and the weir means 190 a long settling and separating middle chamber 195. This area of the low pressure vessel 44 is also that to which heat is transferred through arcuate section 117 of the outer shell 53 directly from the heated medium 121 in the heating device 48. Accordingly, there is effective separation between the water 196 and the oil 197 in the relatively calm section of the liquid in chamber 195. Also much of the remaining gases in the liquids escape to the volume of gas 198 above the liquid level 185, and most of the remaining sediment settles to the bottom of middle chamber 195.

The normal operating pressure in the low pressure vessel 44 is considerably below that of the high pressure tank, normally in the range of about 10 to 25 p.s.i.g., with maximum operating pressure of about 50 p.s.i.g. The lower operating pressure encourages the escape of the residual gases from the surface or level 185 of the liquids. The magnitude of this pressure within the low pressure vessel 44 is normally maintained by the setting of the flow control means 63 in the pipe 61. The pipe 61 receives the gas outflow through gas outlet means 62 which includes another de-misting device 157. The volume of gas 198 is also in communication with an outlet means 200 which is provided with a pressure release means (not shown).

The low pressure vessel 44 is provided with a number of sight glasses through which the various levels, collection of solids, etc. can be observed from the exterior of the vessel. Additionally, as described in relation to the high pressure vessel 40, level sensors may be provided to provide an indication as to the relative level 201 of the water 196 settled to the bottom of the middle chamber 195. The level 201 of the water is maintained below the upper edge 193 of the weir means 190, the edge 193 being lower than the upper edge 184 of the weir 182. The water is withdrawn through the water outlet 199 which is in communication with a lower part of middle chamber 195, and the withdrawn water is piped to a storage reservoir or is otherwise disposed of. There is provided a maximum liquid level sensor 202 for detecting the level 185. This level is in turn utilized in controlling the outlet means 55 through which the oil flows from the chamber 194 to pipe 51. Excess oil production is discharged from oil outlet means 206 to a production tank (not shown).

Referring back to the description of the calculations made as to the selection of the liquid for providing the proper under-balanced pressure down-hole in a particular drilling condition, if a greater pressure may be used so that a decision is made not to pump oil down-hole, but use water instead, then the above described operation conditions would, of course, be varied. This involves controlling the volume of water 196 and the volume of oil 197 so as to maintain the level 201 of water above the upper edge 193 of the weir means 190 so that the water overflows the weir means and occupies the chamber 194. The water normally withdrawn from the water outlet 199 of the low pressure vessel 44 may now be discharged through outlet means 55 and be returned to flow control means 52 for controlled introduction back through the drill tube 33. This ensures a clean drilling fluid is returned down the drill tube 33. Hydrocarbon liquids i.e. oil, returned from the well in the drill fluids is separated in the low pressure vessel 44 and may be collected and discharged through the outlet means 206 to a production tank (not shown).

Located below the separating means 176 in the first chamber 181 of the low pressure vessel 44 is an outlet means 203 through which the collection of drill cuttings and other solids may be removed by way of a system similar to that described in relation to the high pressure vessel 40. A sparging nozzle (not shown) may be associated with the outlet means 203 so as to fluidize the solid materials exiting via the outlet means 203. At opposite ends of the middle chamber there are provided outlet means 204 and 205 for removal of sediment from this chamber, again, in a fashion similar to that used in relation to the chambers of the high pressure vessel 40.

Figure 13:
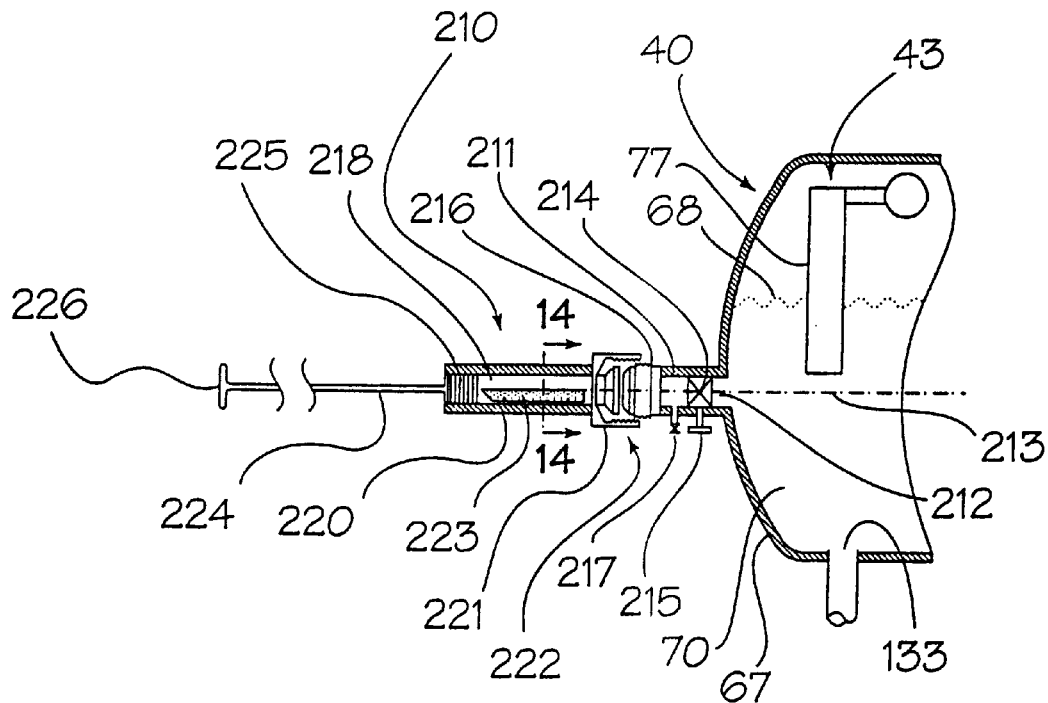
FIG. 13 is a partial sectional view taken through the end of the high pressure vessel at the end containing the separator means and showing a device for withdrawing drill cutting samples from within the vessel.

As is apparent in the separating apparatus of the type of the present invention for use in under-balance drilling, the vessels must remain hermetically sealed, and particularly in the case of the high pressure vessel 40, the system must be capable of retaining high internal pressures. It is necessary, however, when drilling in the production zone to continually analyze the drill cuttings. The cuttings are in the main separated in the first separating chamber 70 of the high pressure vessel, and it is advantageous to be able to retrieve the drill cuttings on a routine basis as they are flushed to the surface from the borehole. Accordingly, there is provided in the vicinity of the first separating chamber 70, immediately below the main separating means 43, a sample taking device 210 illustrated in FIGS. 13 and 14 of the accompanying drawings. While the device 210 is shown as being provided in end wall 67 of the high pressure vessel 40, it may be located in the outer cylindrical shell 131 so as to be insertable immediately under the lower end of the housing means 77 of the main separator means 43. The device 210 includes a hollow tubular projection 211 formed integrally with the end wall 67 and having an open inner end 212 in communication with the interior of the vessel 40, and more particularly, below the level 68 of the liquids in first chamber 70. A central longitudinal axis 213 of the tubular projection 211 is substantially horizontal and passes through the area located directly below the open lower outlet ends of the housing means 77 so as to be positioned in the path of the drill cuttings falling to the bottom of the high pressure vessel at this location. Outwardly of the open inner end 212 is a valve means 214, which is preferably a full open ball valve. The valve means has a manually operable handle 215 which may be turned by a person taking a sample between a fully closed position so as to seal against and passage of fluid from the high pressure vessel 40 and a fully open position in which it provides no obstructing in the tubular projection 211. An outer open end of the tubular projection 211 is enlarged and provided with an external thread 216. Between the outer open end of the tubular projection 211 and the valve means 214 is a bleed valve 217 which can be manually opened from a closed position to an open position permitting communication of the interior of the tubular projection outward of the valve means 214 to atmosphere.

Figure 14:
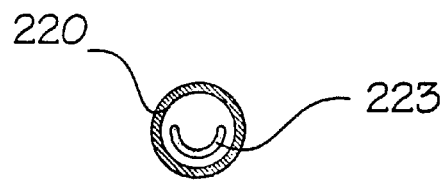
FIG. 14 is a cross sectional view of the sample taking device as seen from the line 14—14 of FIG. 15.

The sample taking device further includes a tubular member 220 which is attachable in an end-to-end fashion with the tubular projection 211. The tubular member 220 has an enlarged, internally threaded end portion 221 which may be screwed onto the external threads 216 of the tubular projection 211. The external threaded 216 and the internally threaded end portion 221 form an attachment 222 preferably in the form of a hammer union which allows ready attachment and removal of the tubular member 220 from the tubular projection 211. Disposed within an interior chamber 218 of the tubular member is a collection member 223 which is in the form of an open trough of substantially semi-circular cross section as can be seen in FIG. 14. The collection member is preferably formed of screen and its radius is less than that of the interior of tubular projection 211 and tubular member 220. Attached to an outer end of the collection member 223 is a straight rod member 224 which slidably projects through a seal 225 in the form of a stuffing box positioned in the outer end of the tubular member 220. The rod member 224 is provided with a handle 226 at its outer end and is of sufficient length to allow the collection member 223 to be moved to an inner collecting position below the outlet of the separator means 43 from which the drill cuttings fall.

Accordingly, normally the valve means 214 is maintained in a closed condition. Without disturbing the separating operation of the system, a sample of the drill cuttings being brought to the surface from the drilling operation can be obtained. The collection member 223 in an empty condition is drawn into the chamber 218 within the tubular member 220 by pulling on the T-bar handle formed by handle 226 at the outer end of the rod member 224. The tubular member 220 is the connected to the outer end of the tubular projection 211 in an end-to-end closed, axially aligned, condition. With bleed valve 217 closed, the valve means 214 is fully opened so that by pushing in on the rod member 224, the collection member 223 is positioned beneath the output of the separator means 43 directly in the path of the drill cuttings falling to the bottom of the first chamber 70. As the liquids are flushed through the screen forming the collection member 223, the drill cuttings are maintained in the trough-shape collection member 223. These drill cuttings are those initially entering the system with the drill fluids coming directly from the borehole. The drill cuttings are immediately removed by withdrawing the rod member 224 so as to position the collection member 223 with its fresh load of drill cuttings within the internal chamber 218 of the tubular member 220. The valve means 214 is then closed, the bleed valve 217 is opened, and the attachment 222 is unthreaded. The tubular member 220 containing the filled collection member 223 can then be removed for dumping and testing.

Figure 15:
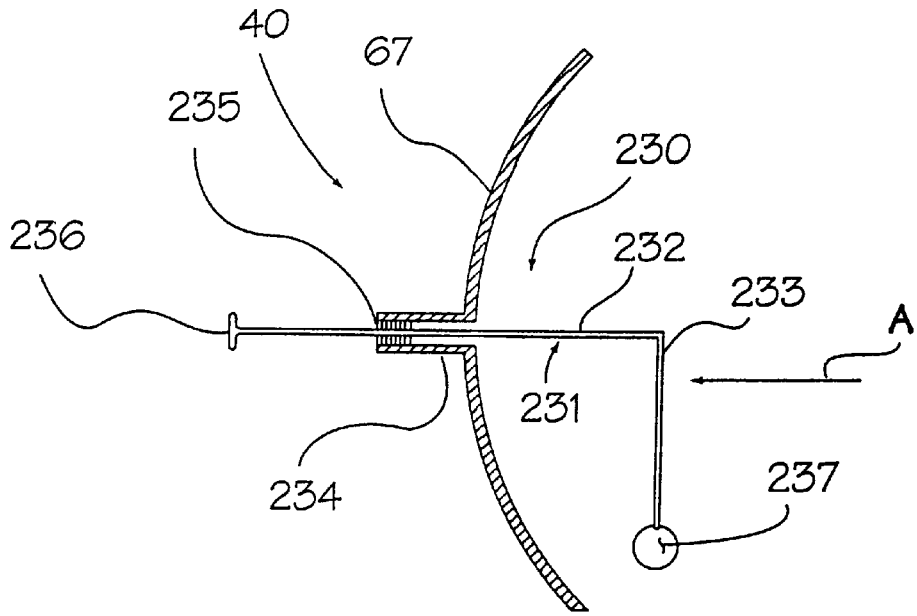
FIG. 15 is a partial sectional view taken through the end of the high pressure vessel, and showing a solids level indicator.
Figure 16:
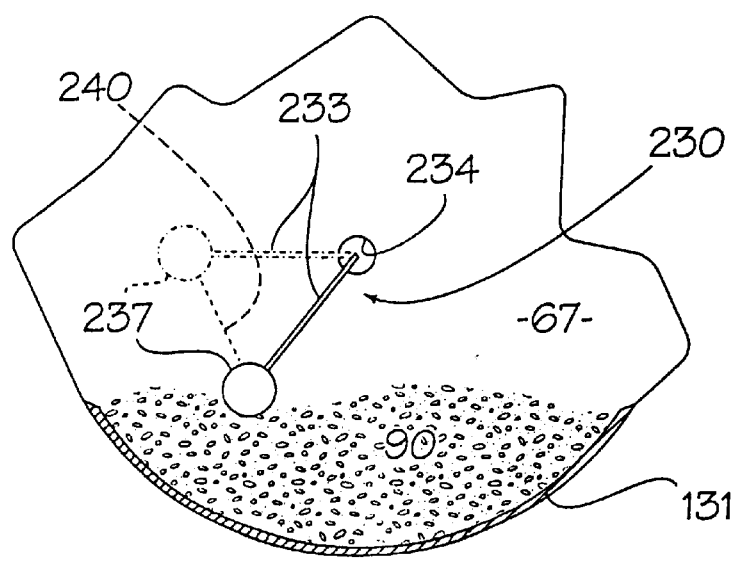
FIG. 16 is a view of the solids level indicator as viewed in the direction of the arrow A in FIG. 15.

It is also possible to provide a solids level indicator device 230 (FIGS. 15 and 16) in the closed high pressure vessel so that while the separation process is in operation, it is possible to determine when there is a sufficient accumulation at 90 to warrant the starting of pump 137 for removal of the drill cuttings from chamber 70 through outlet 133. The device 230 may be provided in association with end wall 67 as shown in FIG. 15 and 16 or with a side wall formed by the outer cylindrical shell 131 of the high pressure vessel 40. The device 230 has a rod member 231 which includes a straight horizontal portion 232 and a second portion 233 which is rigidly affixed to the horizontal portion 232. A hollow tubular member 234 is affixed to the end wall 67 and has an inner end in communication with the interior of the high pressure vessel 40. The outer end of the portion 232 of the rod member 231 extends through a seal 235 in the outer end of the tubular member 234. The seal 235, which may be in the form of a stuffing box, supports the rod members 231 for rotation therein about the longitudinal axis of the horizontal portion 232, but the seal is capable of preventing the escape of high pressure fluid from within the vessel 40. The outer end of the rod member 231 extends beyond the outer end of the tubular member 234 and terminates in a handle portion 236 by which one may grasp the rod member and rotate it. The second portion 233 of the rod member 231 projects at an angle, preferably about 90 degrees, relative to the horizontal portion 232, so that as the rod member 231 is turned within the tubular member 234, the free end of the second portion 233, which has an enlarged member 237 attached thereto, swings along an arc as denoted by the arrow 240 in FIG. 16. The member 237 is preferably spherical, i.e. a ball and it is weighted. Thus as one turns the handle to raise the member 237 and then allows the ball to sink in the liquid above the accumulation 90 of drill cuttings, the weighted ball will sink until it engages the top of the accumulation 90 and then it stops. A scale (not shown) can be provided in association with the exterior part of the rod member so that the location of the rod as it turns to a stop provides an indication of the depth of the drill cuttings below the ball.

While various features have been shown to illustrate the present invention, alternatives will be apparent to those skilled in the art without departing from the spirit of the invention as defined in the appending claims.

What I claim is:

1. A separation system for processing drilling fluids received from a borehole through a delivery pipe, said system comprising:

a first stages high pressure vessel having a fluid inlet for receiving fluid from said delivery pipe;

a second stage, horizontal, low pressure vessel having a liquid inlet means and a liquid outlet means spaced from said liquid inlet means of said low pressure vessel;

a separator means in said high pressure vessel for initial separation of gas and solid drill cuttings from said fluid received by said fluid inlet;

a liquid outlet means for said high pressure vessel spaced from said separator means;

first level control means in said high pressure vessel for maintaining a level of liquid in said high pressure vessel to provide thereabove a space for containing a volume of gas separated from said drilling fluids;

means for conducting liquid from said liquid outlet means of said high pressure vessel to said liquid inlet means of said low pressure vessel;

a settling area defined in said low pressure vessel between said liquid inlet means and said liquid outlet means of said low pressure vessel;

second liquid control means located in said low pressure vessel for maintaining a level of liquid in said low pressure vessel to provide thereabove a space for containing a volume of gas separated from said liquid in said low pressure vessel;

a first gas outlet means in communication with said volume of gas above said level of liquid in said high pressure vessel, a second gas outlet means in communication with said volume of gas above said level of liquid in said low pressure vessel;

a first flow control means in said first gas outlet means for permitting a setting of an operating pressure within said high pressure vessel; and a second flow control means in said second gas outlet means for establishing a positive operating pressure in said low pressure vessel.

2. A separation system for processing drilling fluids received from a borehole through a delivery pipe, said system comprising:

a first stage, high pressure vessel having a fluid inlet for receiving fluid from said delivery pipe;

a second stage, horizontal, low pressure vessel having a liquid inlet means and a liquid outlet means spaced from said liquid inlet means of said low pressure vessel;

a first substantially vertical weir means extending transversely across said high pressure vessel at a distance spaced from one end of said vessel, said weir means defining with said one end of said high pressure vessel an initial separating chamber, a separator means in said high pressure vessel for initial separation of gas and solid drill cuttings from said fluid received by said fluid inlet;

a liquid outlet means for said high pressure vessel spaced from said separator means;

first level control means in said high pressure vessel for maintaining a level of liquid in said high pressure vessel to provide thereabove a space for containing a volume of gas separated from said drilling fluids;

said separator means including a substantially horizontal manifold portion positioned above said liquid level in said chamber, said manifold portion having an open end for connection to said delivery pipe for reception of said drilling fluids from said borehole into an interior chamber of said manifold portion;

means for conducting liquid from said liquid outlet means of said high pressure vessel to said liquid inlet means of said low pressure vessel;

a settling area defined in said low pressure vessel between said liquid inlet means and said liquid outlet means of said low pressure vessel;

second liquid control means located in said low pressure vessel for maintaining a level of liquid in said low pressure vessel to provide thereabove a space for containing a volume of gas separated from said liquid in said low pressure vessel;

a first gas outlet means in communication with said volume of gas above said level of liquid in said high pressure vessel;

a second gas outlet means in communication with said volume of gas above said level of liquid in said low pressure vessel;

a first flow control means in said first gas outlet means for permitting a setting of an operating pressure within said high pressure vessel; and a second flow control means in said second gas outlet means for establishing a positive operating pressure in said low pressure vessel.

3. A separation system as defined in claim 2, wherein said manifold portion of said separator means extends transversely of said high pressure-vessel, and wherein said separator means further includes;

a plurality of housing means disposed along at least one side of said manifold portions each housing means having an inner wall defining a cylindrical internal swirl chamber about a substantial vertical central axis, means defining fluid inlet passages communicating said interior chamber of said manifold portion with an upper portion of said internal swirl chamber of each of said housing means, said internal swirl chamber of each housing means extending to an open bottom of said housing means defining a drill cutting and liquid outlet below said liquid level of said high pressure vessels and a tubular portion having an open upper end defining a gas outlet at a top of said housing, said tubular portion being coaxially disposed within said swirl chamber and being of less external diameter than that of said swirl chamber to provide an annular space between said tubular portion and said wall defining said swirl chamber, a lower open end of said tubular member extending below said fluid inlet passage of said swirl chamber but terminating above said liquid level of said separating chamber of said high pressure vessel.

4. A separation system as defined in claim 2, wherein said high pressure vessel is a horizontal vessel formed by a substantially cylindrical outer wall and closed by end walls, and wherein said low pressure vessel is formed of a substantially cylindrical outer wall closed by end walls, said low pressure vessel having a volume considerably larger than said high pressure vessel.

5. A separation system as defined in claim 4, wherein said high pressure vessel includes a weir adjacent to but spaced from one of said end walls of said high pressure vessel for defining a first separation chamber therebetween, said separator means being disposed in said first chamber, and a second weir adjacent to but spaced from the other end wall of said high pressure vessel for defining a third separating chamber therebetween, a second separating chamber being defined between said first and second weirs, said weirs each having top overflow edge extending transversely across the high pressure vessel, said second chamber providing a collecting area for a heavier density liquid and said third chamber providing a collecting area for a lighter density liquid, said liquid outlet means of said high pressure vessel including a liquid outlet for removal of liquid from said second chamber to thereby maintain a liquid level of the heavier density liquid therein below said top overflow edge of said second weir.

6. A separation system as defined in claim 5, wherein said liquid outlet means of said high pressure vessel includes a separate outlet for removal of a lighter density liquid from said third chamber.

7. A separation system as defined in claim 6, and further including metering means for separately determining the volume of liquids removed from said second and third chambers of said high pressure vessel.

8. A separation system as defined in claim 5, and further comprising a drill cuttings outlet disposed in a lower portion of said first chamber.

9. A separation system as defined in claim 8, and further including a manually externally operable detecting device for establishing an amount of accumulation of drill cuttings in a lower portion of said first chamber of said high pressure chamber.

10. A separation system as defined in claim 2, and further comprising;

a heating device including;

a jacket defining a chamber for containing a heated medium in contact with a portion of said elongated cylindrical outer wall defining said low pressure vessel for transfer of heat into said liquid in said lower pressure vessel.

11. A separation system as defined in claim 10, wherein said heating device further includes;

a length of tubing disposed in and exposed externally to said fluid in said high pressure vessel; and heated medium conducting means for forcing heated medium from said chamber of said jacket through said tubing in said high pressure vessel whereby heat is transferred from said heated medium to said fluid in said high pressure vessel.

12. A separation system for processing drilling fluids received from a borehole through a delivery pipe, said system comprising:

a first stage, high pressure vessel having a fluid inlet for receiving fluid from said delivery pipe;

a second stage, horizontal, low pressure vessel having a liquid inlet means and a liquid outlet means spaced from said liquid inlet means of said low pressure vessel;

a separator means in said high pressure vessel for initial separation of gas and solid drill cuttings from said fluid received by said fluid inlet;

said separator means in said high pressure vessel having a drill cuttings outlet for discharging said drill cuttings therebelow;

a sample taking device for catching and removing drill cuttings from beneath said separator means through a wall of said high pressure vessel at required times for analyzing, said sample taking device including:

a tubular projection communicating with the interior of said vessel and being aligned with an area below said drill cuttings outlet of said separator means, said tubular projection having an open outer end provided with first joining means and a shut off valve means disposed between said outer end and said wall of said vessel;

a tubular member defining an interior chamber and having second joining means at an inner end thereof, said first and second joining means providing for end-to-end sealing attachment of said tubular member to said tubular projection, said tubular member having an outer end containing a stuffing box, a collecting member contained in an inactive condition within said interior chamber, a rod member slidably extending through said stuffing box and being attached to said collecting member, whereby, retrieval of drill cuttings is achieved by:
1) end-to-end attachment of said tubular member to said tubular projection and opening of said valve means of said tubular projection,
2) sliding of said rod member to position said collecting member beneath said separator means for catching drilling cuttings therein,
3) withdrawing said rod member to reposition said collecting member in said chamber of said tubular member, and
4) closing of said valve means and detachment of said tubular member from said tubular projection;

a liquid outlet means for said high pressure vessel spaced from said separator means;

first level control means in said high pressure vessel for maintaining a level of liquid in said high pressure vessel to provide thereabove a space for containing a volume of gas separated from said drilling fluids;

means for conducting liquid from said liquid outlet means of said high pressure vessel to said liquid inlet means of said low pressure vessel;

a settling area defined in said low pressure vessel between said liquid inlet means and said liquid outlet means of said low pressure vessel;

second liquid control means located in said low pressure vessel for maintaining a level of liquid in said low pressure vessel to provide thereabove a space for containing a volume of gas separated from said liquid in said low pressure vessel;

a first gas outlet means in communication with said volume of gas above said level of liquid in said high pressure vessel;

a second gas outlet means in communication with said volume of gas above said level of liquid in said low pressure vessel;

a first flow control means in said first gas outlet means for permitting a setting of an operating pressure within said high pressure vessel; and a second flow control means in said second gas outlet means for establishing a positive operating pressure in said low pressure vessel.

13. A separation system for processing drilling fluids received from a borehole through a delivery pipe, said system comprising:

a first stage, high pressure vessel having a fluid inlet for receiving fluid from said delivery pipe;

a second stage, horizontal, low pressure vessel having a liquid inlet means and a liquid outlet means spaced from said liquid inlet means of said low pressure vessel;

a separator means in said high pressure vessel for initial separation of gas and solid drill cuttings from said fluid received by said fluid inlet;

a liquid outlet means for said high pressure vessel spaced from said separator means;

first level control means in said high pressure vessel for maintaining a level of liquid in said high pressure vessel to provide thereabove a space for containing a volume of gas separated from said drilling fluids;

means for conducting liquid from said liquid outlet means of said high pressure vessel to said liquid inlet means of said low pressure vessel;

a settling area defined in said low pressure vessel between said liquid inlet means and said liquid outlet means of said low pressure vessel;

second liquid control means located in said low pressure vessel for maintaining a level of liquid in said low pressure vessel to provide thereabove a space for containing a volume of gas separated from said liquid in said low pressure vessel;

a first gas outlet means in communication with said volume of gas above said level of liquid in said high pressure vessel;

a second gas outlet means in communication with said volume of gas above said level of liquid in said low pressure vessel;

said at least one of said gas outlet means of said high pressure and low pressure vessels being provided with a de-misting device above the level of liquid in the respective vessel, said de-misting device comprising:

an outer housing having an inner wall defining an upper cylindrical chamber about a substantially vertical central axis, said housing having a closed lower portion below said chamber and defining a moisture outlet therein, said housing further defining at least one gas inlet adjacent an upper end of said chamber, and a tubular portion extending through a top of said housing and having an open upper end providing a gas exit from an interior of said tubular member to said gas outlet means of said vessel, said tubular portion being coaxially disposed within said chamber and being of lesser external diameter than said chamber to thereby provide an annular space between said inner wall of said chamber and an exterior surface of said tubular member, said tubular portion having a lower open end spaced below said gas inlet means of said housing and above said lower portion of said housing to thereby provide a gas passage downwardly from said inlet means and then upwardly through said interior of said tubular member to said gas outlet means;

a first flow control means in said first gas outlet means for permitting a setting of an operating pressure within said high pressure vessel; and a second flow control means in said second gas outlet means for establishing a positive operating pressure in said low pressure vessel.

14. A separation system for processing drilling fluids received from a borehole through a delivery pipe, said system comprising:

a first stage, high pressure vessel having a fluid inlet for receiving fluid from said delivery pipe;

a second stage, horizontal, low pressure vessel having a liquid inlet means and a liquid outlet means spaced from said liquid inlet means of said low pressure vessel;

said high pressure vessel being a horizontal vessel formed by a substantially cylindrical outer wall and closed by end walls;

said low pressure vessel being formed of a substantially cylindrical outer wall closed by end walls;

said low pressure vessel having a volume considerably larger than said high pressure vessel;

said high pressure vessel including a weir adjacent to but spaced from one of said end walls of said high pressure vessel for defining a first separation chamber therebetween;

a separator means in said high pressure vessel for initial separation of gas and solid drill cuttings from said fluid received by said fluid inlet;

a liquid outlet means for said high pressure vessel spaced from said separator means;

first level control means in said high pressure vessel for maintaining a level of liquid in said high pressure vessel to provide thereabove a space for containing a volume of gas separated from said drilling fluids;

means for conducting liquid from said liquid outlet means of said high pressure vessel to said liquid inlet means of said low pressure vessel;

said separator means being disposed in said first chamber;

a drill cuttings outlet disposed in a lower portion of said first chamber, a manually externally operable detecting device for establishing an amount of accumulation of drill cuttings in a lower portion of said first chamber of said high pressure chamber;

said detecting device including a rod member having a substantially horizontal portion rotatably received in a stuffing box in one of said walls of said high pressure vessel, said rod member having an accessible handle means exterior of said high pressure vessel and an inner end located below said separator means in said first chamber, said rod member having a second portion extending substantially radially from said inner end and terminating in an enlarged portion for engagement with said accumulation of drill cuttings as said enlarged portion is lowered by rotation of said rod member;

a second weir adjacent to but spaced from the other end wall of said high pressure vessel for defining a third separating chamber therebetween;

a second separating chamber being defined between said first and second weirs, said weirs each having top overflow edges extending transversely across the high pressure vessel, said second chamber providing a collecting area for a heavier density liquid and said third chamber providing a collecting area for a lighter density liquid;

said liquid outlet means of said high pressure vessel including a liquid outlet for removal of liquid from said second chamber to thereby maintain a liquid level of the heavier density liquid therein below said top overflow edge of said second weir;

a settling area defined in said low pressure vessel between said liquid inlet means and said liquid outlet means of said low pressure vessel;

second liquid control means located in said low pressure vessel for maintaining a level of liquid in said low pressure vessel to provide thereabove a space for containing a volume of gas separated from said liquid in said low pressure vessel;

a first gas outlet means in communication with said volume of gas above said level of liquid in said high pressure vessel;

a second gas outlet means in communication with said volume of gas above said level of liquid in said low pressure vessel;

a first flow control means in said first gas outlet means for permitting a setting of an operating pressure within said high pressure vessel; and a second flow control means in said second gas outlet means for establishing a positive operating pressure in said low pressure vessel.

15. A separation system for processing drilling fluids received from a borehole through a delivery pipe, said system comprising:

a first stage, high pressure vessel having a fluid inlet for receiving fluid from said delivery pipe;

a second stage, horizontal, low pressure vessel having a liquid inlet means and a liquid outlet means spaced from said liquid inlet means of said low pressure vessel;

a separator means in said high Pressure vessel for initial separation of gas and solid drill cuttings from said fluid received by said fluid inlet;

a liquid outlet means for said high pressure vessel spaced from said separator means;

said high pressure vessel including a weir adjacent to but spaced from one of said end walls of said high pressure vessel for defining a first separation chamber therebetween;

said separator means being disposed in said first chamber;

a second weir adjacent to but spaced from the other end wall of said high pressure vessel for defining a third separating chamber therebetween;

a second separating chamber being defined between said first and second weirs;

said weirs each having top overflow edge extending transversely across the high pressure vessel;

said second chamber providing a collecting area for a heavier density liquid and said third chamber providing a collecting area for a lighter density liquid;

first level control means in said high pressure vessel for maintaining a level of liquid in said high pressure vessel to provide thereabove a space for containing a volume of gas separated from said drilling fluids;

said liquid outlet means of said high pressure vessel including a liquid outlet for removal of liquid from said second chamber to thereby maintain a liquid level of the heavier density liquid therein below said top overflow edge of said second weir;

said liquid outlet means of said high pressure vessel including a separate outlet for removal of a lighter density liquid from said third chamber;

metering means for separately determining the volume of liquids removed from said second and third chambers of said high pressure vessel;

means for conducting liquid from said liquid outlet means of said high pressure vessel to said liquid inlet means of said low pressure vessel;

said means for conducting liquid from said outlet means of said high pressure vessel to said inlet means of said low pressure vessel including a piping for recombining the liquids subsequent to metering and conducting the recombined liquids to said liquid inlet means of said lower pressure vessel;

a settling area defined in said low pressure vessel between said liquid inlet means and said liquid outlet means of said low pressure vessel;

second liquid control means located in said low pressure vessel for maintaining a level of liquid in said low pressure vessel to provide thereabove a space for containing a volume of gas separated from said liquid in said low pressure vessel;

a first gas outlet means in communication with said volume of gas above said level of liquid in said high pressure vessel;

a second gas outlet means in communication with said volume of gas above said level of liquid in said low pressure vessel;

a first flow control means in said first gas outlet means for permitting a setting of an operating pressure within said high pressure vessel; and a second flow control means in said second gas outlet means for establishing a positive operating pressure in said low pressure vessel.

16. In a closed pressure vessel for processing drilling fluids received from a borehole through a delivery pipe, said vessel having therein a separator means for receiving said drilling fluids from said delivery pipe and for separating drill cuttings from said drilling fluids, said separating means having a drill cuttings outlet for discharging said drill cuttings therebelow, said vessel including outlet means below said separator means for removing an accumulation of said drill cuttings for disposal, an improvement comprising a sample taking device for catching and removing drill cuttings from beneath said separator means through a wall of said vessel at required times for analyzing, said sample taking device including:

a tubular projection communicating with the interior of said vessel and being aligned with an area below said drill cuttings outlet of said separator means, said tubular projection having an open outer end provided with first joining means and a shut off valve means disposed between said outer end and said wall of said vessel;

a tubular member defining an interior chamber and having second joining means at an inner end thereof, said first and second joining means providing for end-to-end sealing attachment of said tubular member to said tubular projection;

said tubular member having an outer end containing a stuffing box;

a collecting member contained in an inactive condition within said interior chamber, a rod member slidably extending through said stuffing box and being attached to said collecting member;

whereby, retrieval of drill cuttings is achieved by;
1) end-to-end attachment of said tubular member to said tubular projection and opening of said valve means of said tubular projection,
2) sliding of said rod member to position said collecting member beneath said separator means for catching drilling cuttings therein,
3) withdrawing said rod member to reposition said collecting member in said chamber of said tubular member, and
4) closing of said valve means and detachment of said tubular member from said tubular projections.

17. A sample taking device as defined in claim 16, wherein said collecting member includes a trough shaped member formed of a screen material.

18. In a separating system for processing drilling fluids received from a borehole through a delivery pipe, said system including;

a pressure vessel having a fluid inlet means for receiving fluid from said delivery pipe, a liquid outlet means for said vessel, a level control means in said vessel for maintaining a level of liquid in said vessel to thereby provide a space for containing a volume of gas separated from said fluids above said level of liquid, and a gas outlet means spaced from said fluid inlet means and in communication with said volume of gas;

an improvement comprising a de-misting device providing said communication between said volume of gas and said gas outlet means and disposed above said level of said liquid, said de-misting means comprising;

an outer housing having an inner wall defining an upper cylindrical chamber about a substantially vertical central axis, said housing having a closed lower portion below said chamber and defining a moisture outlet therein, said housing further defining at least one gas inlet adjacent an upper end of said chamber, and a tubular portion extending through a top of said housing and having an open upper end providing a gas exit from an interior of said tubular member to said gas outlet means of said vessel, said tubular portion being coaxially disposed within said chamber and being of lesser external diameter than said chamber to thereby provide an annular space between said inner wall of said chamber and an exterior surface of said tubular member, said tubular portion having an lower open end spaced below said gas inlet means of said housing and above lower portion of said housing to thereby provide a gas passage downwardly from said inlet means and then upwardly through said interior of said tubular member to said gas outlet means.

* * * * *